United States Patent
Ito et al.

(10) Patent No.: US 8,879,375 B2
(45) Date of Patent: Nov. 4, 2014

(54) OPTICAL PICKUP AND OPTICAL DISK DEVICE

(71) Applicant: Panasonic Corporation, Osaka (JP)

(72) Inventors: Kiyotaka Ito, Kyoto (JP); Yasumori Hino, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/123,353

(22) PCT Filed: Mar. 29, 2013

(86) PCT No.: PCT/JP2013/002172
§ 371 (c)(1),
(2), (4) Date: Dec. 2, 2013

(87) PCT Pub. No.: WO2013/150756
PCT Pub. Date: Oct. 10, 2013

(65) Prior Publication Data
US 2014/0109117 A1 Apr. 17, 2014

(30) Foreign Application Priority Data
Apr. 2, 2012 (JP) ................................. 2012-084187

(51) Int. Cl.
| G11B 7/135 | (2012.01) |
| G11B 7/1362 | (2012.01) |
| G11B 7/005 | (2006.01) |
| G11B 7/1356 | (2012.01) |
| G11B 7/127 | (2012.01) |

(52) U.S. Cl.
CPC ............. *G11B 7/1362* (2013.01); *G11B 7/135* (2013.01); *G11B 7/1356* (2013.01); *G11B 7/005* (2013.01); *G11B 7/127* (2013.01)
USPC .................................................. 369/112.29

(58) Field of Classification Search
None
See application file for complete search history.

(56) References Cited

U.S. PATENT DOCUMENTS

| 8,098,548 B2* | 1/2012 | Mikami et al. .............. 369/44.23 |
| 2003/0081222 A1* | 5/2003 | Kato ............................. 356/495 |
| 2005/0226126 A1 | 10/2005 | Abe et al. |

(Continued)

FOREIGN PATENT DOCUMENTS

| JP | 2002-334470 | 11/2002 |
| JP | 2005-267795 | 9/2005 |

(Continued)

OTHER PUBLICATIONS

International Search Report issued May 7, 2013 in International (PCT) Application No. PCT/JP2013/002172.

*Primary Examiner* — Brenda Bernardi
(74) *Attorney, Agent, or Firm* — Wenderoth, Lind & Ponack, L.L.P.

(57) ABSTRACT

The laser light source, the PBS, and the reference light mirror are arranged in such a manner as to simultaneously satisfy $L_{sig}+L_{BS} \neq s \cdot (L_{ld}/m)$ (s: positive integer, m: positive integer), $L_{ref}+L_{BS} \neq t \cdot (L_{ld}/m)$ (t: positive integer), and $u(L_{ld}/m)-(\Delta L/2) \leq L_{sig}-L_{ref} \leq u(L_{ld}/m)+(\Delta L/2)$ (u: integer), where $L_{ld}$ represents an in-vacuum internal resonator length of the laser light source, $L_{BS}$ represents an in-vacuum-converted optical path length of a laser beam between the emission end surface of the laser light source and the PBS, $L_{sig}$ represents an in-vacuum-converted optical path length of signal light between the PBS and the reflecting unit of the optical disk, $L_{ref}$ represents an in-vacuum-converted optical path length of reference light between the PBS and the reference light mirror, and $\Delta L$ represents an interference permissible optical path length of the laser beam.

5 Claims, 14 Drawing Sheets

(56) References Cited

U.S. PATENT DOCUMENTS

| | | |
|---|---|---|
| 2007/0274171 A1 | 11/2007 | Shimano et al. |
| 2008/0067321 A1 | 3/2008 | Miyamoto et al. |
| 2008/0205246 A1* | 8/2008 | Shimano et al. ......... 369/112.16 |
| 2010/0039917 A1* | 2/2010 | Ide ............................... 369/100 |
| 2010/0188961 A1 | 7/2010 | Shimano et al. |
| 2012/0008483 A1* | 1/2012 | Mikami ................... 369/112.17 |

FOREIGN PATENT DOCUMENTS

| | | |
|---|---|---|
| JP | 2007-317284 | 12/2007 |
| JP | 2008-65961 | 3/2008 |
| WO | 2007/080925 | 7/2007 |

* cited by examiner

OPTICAL PICKUP AND OPTICAL DISK DEVICE

TECHNICAL FIELD

The present invention relates to an optical pickup for detecting a modulated signal by detecting interference light in which intensity/phase-modulated signal light and reference light interfere with each other, and relates to an optical disk device having the optical pickup.

BACKGROUND ART

Optical disks have widely been used as high-capacity information recording media. For the purpose of increasing the capacity of optical disks, the technology thereof has been developed from CDs to DVDs and then to Blu-ray Discs™ by adopting laser beams of shorter wavelengths and objective lenses having higher numerical apertures (NA). Recently, given that such services as cloud computing that utilizes online storage on the Internet have been expanding year by year, a further capacity enlargement of storages including HDDs (hard disk drives) and flash memories is desired.

The following developments are underway with respect to further capacity increase of optical disks.

First of all, in order to reduce a wavelength of a laser beam, a semiconductor laser light source that emits a laser beam in a ultraviolet range of 300 nm to less than 400 nm has been put to practical use. However, because light in an ultraviolet range of 300 nm or less attenuates significantly in the air, reducing the wavelength of the laser beam cannot be expected to provide any great benefits.

As far as increasing NA is concerned, technology has been developed for increasing recording surface density by means of a system that uses an SIL (solid immersion lens) having an NA of one or higher. Also, research has been carried out for increasing recording surface density by means of near-field light that occurs in a region smaller than a diffraction limit of light. In addition, BD-XL among currently commercially-available optical disks has three or four recording surfaces, but current research aims to enlarge the capacity of optical disks by further increasing the number of recording surfaces.

With such ongoing development of increasing the capacity of optical disks, increasing the number of recording surface layers, in particular, could further reduce the amount of signal light to be modulated by reflection by a recording surface of an optical disk, resulting in not being able to secure a sufficient S/N of a reproduction signal. Thus, further increasing an S/N of a detected signal becomes essential in order to keep increasing the capacity of optical disks.

Techniques for further increasing an S/N of a reproduction signal of an optical disk include an optical disk device that uses optical interference. Such an optical disk device using optical interference is disclosed in, for example, Patent Literature 1 or 2. An optical disk device using optical interference obtains large signal amplitude by using reference light to amplify a weak signal amplitude that is obtained by detecting signal light only in a conventional optical disk. First, a laser beam emitted from a laser light source is divided into signal light that is radiated onto an optical disk and reference light that is not radiated onto the optical disk. Subsequently, the signal light reflected off of an optical disk and the reference light reflected off of a reference light mirror interfere with each other. In principle, increasing the intensity of the reference light within an allowable range can further increase an S/N with respect to noise generated in a light detector or an electric circuit.

Furthermore, in the optical disk device, part of the signal light of the laser beam, which is reflected off of the optical disk, generates noise when returning to the laser light source, the laser beam being output from the laser light source of the optical pickup. This noise is generally called "return light noise." This return light noise is generated when a reflective surface of the optical disk functions as an external resonator with respect to a resonator provided in the laser light source and when the external resonator affects an oscillation wavelength of the laser light source. In a conventional optical disk device that does not use optical interference, return light noise caused therein can be eliminated or reduced by using a combination of optical elements such as a λ/4 waveplate and a polarization beam splitter (PBS), by using a driving current in a laser light source, the driving current being obtained by superimposing a high-frequency current onto a DC current, or by using a self-oscillating laser light source.

However, the conventional optical disk device that does not use optical interference only considers a way to eliminate or reduce return light noise caused due to the relationship between the laser light source and the optical disk, and does not take into consideration return light noise caused by light reflected off of an optical component other than the optical disk. In such an optical disk device that does not use optical interference, return light to the laser light source can easily be inhibited by arranging the optical elements of the optical pickup other than the optical disk at inclinations so as not to be perpendicular to the direction of travel of the laser beam.

The inventors of the present invention had discovered, in the conventional optical disk device using optical interference, that new return light noise is likely to occur due to the relationship between its reference light mirror for reflecting reference light and the laser light source, in addition to the return light noise caused by the relationship between the optical disk and the laser light source. The return light from the reference light mirror could further worsen the S/N ratio.

The conventional optical disk device is described in detail with reference to FIG. 16. FIG. 16 is a diagram showing a configuration of the conventional optical disk device using optical interference. First, return light caused by a laser light source 101 and an optical disk 107 is described with reference to FIG. 16.

A laser beam output from the laser light source 101 is converted into parallel light by a collimating lens 102. The laser beam converted into parallel light passes through a λ/2 waveplate 103. The polarization direction of the laser beam passing through the λ/2 waveplate 103 is rotated by a random angle. The polarization direction of the laser beam passing through the λ/2 waveplate 103 determines the split ratio between the intensities of signal light and reference light that are divided at a PBS 104.

Divided light reflected off of the PBS 104 is the signal light. The signal light passes through a λ/4 waveplate 105 and is then focused on an objective lens 106. The focused signal light is reflected off of a reflective layer 108 of the optical disk 107. The signal light reflected off of the optical disk 107 travels toward the PBS 104 through an optical axis same as that of signal light traveling from the PBS 104 to the optical disk 107. The signal light reflected off of the reflective layer 108 of the optical disk 107 passes through the objective lens 106 again and is converted into parallel light. After passing through the objective lens 106 again and being converted into parallel light, the signal light passes through the λ/4 waveplate 105 again and returns to the PBS 104. At this point, the λ/4 waveplate 105 rotates the polarization direction of the signal light traveling from the optical disk 107 to the PBS 104 by approximately 90 degrees with respect to the polarization direction of the signal light traveling from the PBS 104 to the optical disk 107. The angle of "approximately 90 degrees" is set in consideration of errors in manufacturing the optical elements, errors in placement of the optical elements, and errors in the polarization directions due to the effect of the birefringence in the optical disk or optical elements.

Because the polarization direction of the signal light that has returned to the PBS 104 is rotated by approximately 90 degrees, most of the signal light that has returned to the PBS 104 is transmitted through the PBS 104 and received by an interference light detector 111. However, due to possible errors in the polarization directions as described above, part of the signal light that has returned to the PBS 104 is reflected off of the PBS 104, passes through the optical axis same as that of the laser beam traveling from the laser light source 101, and returns to the laser light source 101 as return light.

The return light generated by the laser light source 101 and a reference light mirror 110 is described next with reference to FIG. 16. The details overlapping with the description of the return light caused by the laser light source 101 and the optical disk 107 are omitted in the following description.

The divided light transmitted through the PBS 104 becomes reference light. The reference light passes through a λ/4 waveplate 109 and is then reflected off of the reference light mirror 110. The reference light reflected off of the reference light mirror 110 travels toward the PBS 104 through the optical axis same as that of reference light traveling from the PBS 104 to the reference light mirror 110. The reference light reflected off of the reference light mirror 110 passes through the λ/4 waveplate 109 again and returns to the PBS 104. At this point, the λ/4 waveplate 109 rotates the polarization direction of the reference light traveling from the reference light mirror 110 toward the PBS 104 by approximately 90 degrees with respect to the polarization direction of the reference light traveling from the PBS 104 toward the reference light mirror 110.

Because the polarization direction of the reference light that has returned to the PBS 104 is rotated by approximately 90 degrees, most of the reference light that has returned to the PBS 104 is reflected off of the PBS 104 and received by the interference light detector 111. However, due to possible errors in the polarization directions as described above, part of the reference light that has returned to the PBS 104 is transmitted through the PBS 104, passes through the optical axis same as that of the laser beam output from the laser light source 101, and returns to the laser light source 101 as return light. Furthermore, because the reflectance of the reference light mirror 110 is extremely higher than that of the reflective layer 108 of the optical disk 107, an extremely large effect of the return light of the reference light is produced.

When the reference light mirror 110 is tilted to shift the optical axis of the reference light as carried out in the conventional optical disk device that does not use optical interference, the optical axis of the signal light reflected off of the optical disk 107 and transmitted through the PBS 104 no longer coincides with the optical axis of the reference light reflected off of the reference light mirror 110 and then the PBS 104. As a result, the effect of amplifying a signal amplitude by optical interference cannot be produced.

On the other hand, the use of a driving current in the laser light source, the driving current being obtained by superimposing a high-frequency current onto a DC current, and the use of a self-oscillating laser light source as in the prior art, expands the line width of an oscillation spectrum of the laser light source, reducing the temporal coherence and consequently the coherence length. Therefore, these methods are not the most appropriate methods for the optical disk device using optical interference.

CITATION LIST

Patent Literature

Patent Literature 1: Japanese Patent Application Publication No. 2007-317284
Patent Literature 2: Japanese Patent Application Publication No. 2008-065961

SUMMARY OF THE INVENTION

The present invention was contrived in order to solve these problems, and an object thereof is to provide an optical pickup and an optical disk device capable of reducing noise that is generated by external resonance due to return light of signal light and reference light, and also capable of obtaining a reproduction signal having a high S/N ratio.

An optical pickup according to one aspect of the present invention has: a laser light source for emitting a laser beam; a laser beam divider that divides the laser beam emitted from the laser light source into signal light that is focused on a reflecting unit of an optical disk and reference light that is not focused on the optical disk; a reference light mirror that reflects the reference light; and an interference light detecting unit that detects interference light in which the signal light modulated by the reflecting unit of the optical disk and the reference light reflected off of the reference light mirror interfere with each other, wherein the laser light source, the laser beam divider, and the reference light mirror are arranged in such a manner as to satisfy the following expressions (1) to (3) simultaneously, where $L_{ld}$ represents an in-vacuum internal resonator length of the laser light source that is obtained as a product of an internal resonator length of the laser light source and an internal resonator refractive index of the laser light source, $L_{BS}$ represents an in-vacuum-converted optical path length of the laser beam between an emission end surface of the laser light source and the laser beam divider, $L_{sig}$ represents an in-vacuum-converted optical path length of the signal light between the laser beam divider and the reflecting unit of the optical disk, $L_{ref}$ represents an in-vacuum-converted optical path length of the reference light between the laser beam divider and the reference light mirror, and $\Delta L$ represents an interference permissible optical path length of the laser beam.

[Math. 1]

$$L_{sig} + L_{BS} \neq s\frac{L_{ld}}{m} \quad (1)$$

(s: positive integer, m: positive integer)

[Math. 2]

$$L_{ref} + L_{BS} \neq t\frac{L_{ld}}{m} \quad (2)$$

(t: positive integer)

[Math. 3]

$$u\frac{L_{ld}}{m} - \frac{\Delta L}{2} \leq L_{sig} - L_{ref} \leq u\frac{L_{ld}}{m} + \frac{\Delta L}{2} \quad (3)$$

(u: integer)

According to this configuration, the laser light source emits a laser beam. The laser beam divider divides the laser beam emitted from the laser light source into signal light that is focused on a reflecting unit of an optical disk and reference light that is not focused on the optical disk. The reference light mirror reflects the reference light. The interference light detecting unit detects interference light in which the signal light modulated by the reflecting unit of the optical disk and the reference light reflected off of the reference light mirror interfere with each other. The laser light source, the laser beam divider, and the reference light mirror are arranged in such a manner as to satisfy the expressions (1) to (3) simultaneously, where $L_{ld}$ represents an in-vacuum internal resonator length of the laser light source that is obtained as a product of an internal resonator length of the laser light source and an internal resonator refractive index of the laser light source, $L_{BS}$ represents an in-vacuum-converted optical path length of the laser beam between an emission end surface of the laser light source and the laser beam divider, $L_{Sig}$ represents an in-vacuum-converted optical path length of the signal light between the laser beam divider and the reflecting unit of the optical disk, $L_{ref}$ represents an in-vacuum-converted optical path length of the reference light between the laser beam divider and the reference light mirror, and $\Delta L$ represents an interference permissible optical path length of the laser beam.

According to the present invention, arranging the laser light source, the laser beam divider, and the reference light mirror in such a manner as to satisfy the expressions (1) to (3) can reduce noise that is generated as a result of external resonance caused by return light of the signal light and the reference light and obtain a reproduction signal having a high S/N ratio.

The objects, features, and advantages of the present invention will become more apparent from the following detailed description and the accompanying drawings.

DESCRIPTION OF EMBODIMENTS

Embodiments of the present invention are described hereinafter with reference to the drawings. Note that each of the following embodiments is merely an example embodying the present invention and is not intended to limit the technical scope of the present invention.

Embodiment 1

Figure 1:
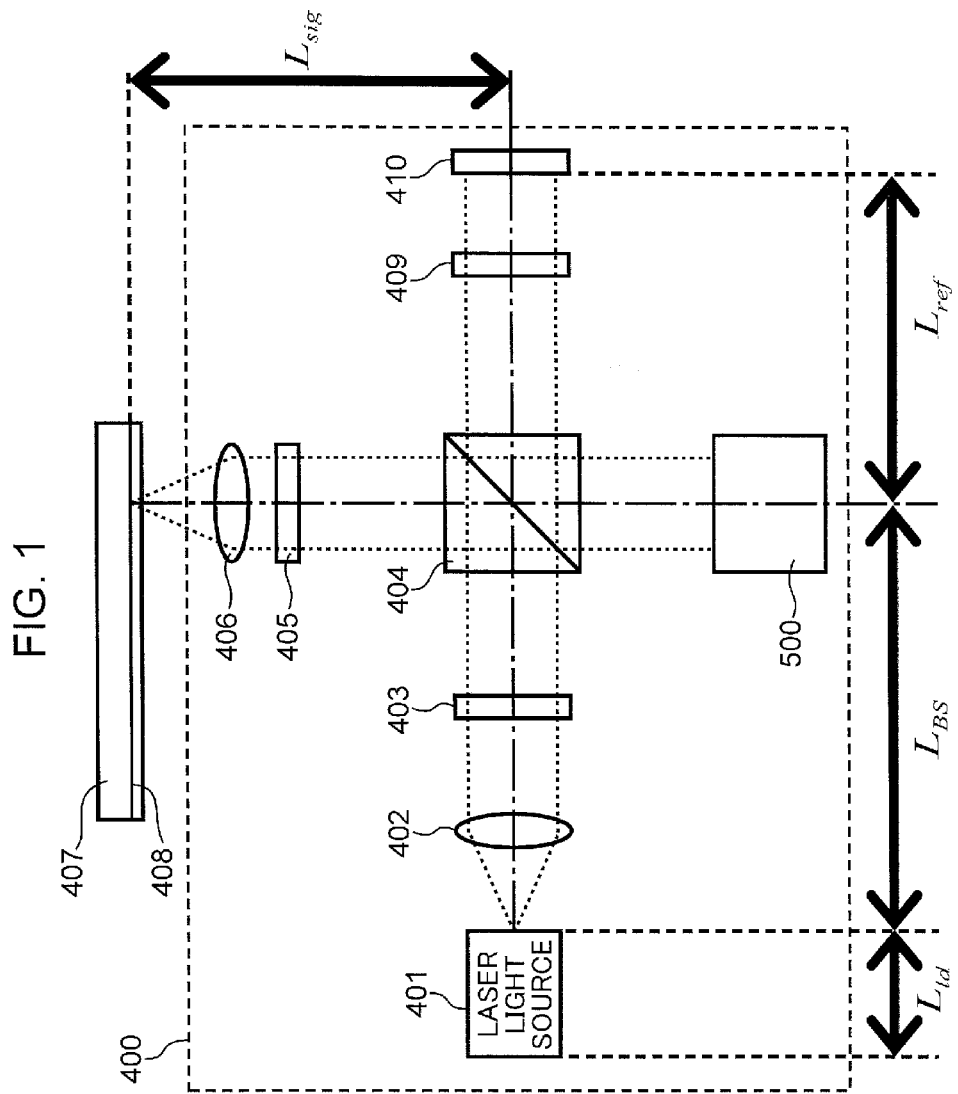
FIG. 1 is a diagram showing a schematic configuration of an optical pickup according to Embodiment 1 of the present invention.

FIG. 1 is a diagram showing a schematic configuration of an optical pickup according to Embodiment 1 of the present invention. The optical pickup according to Embodiment 1 of the present invention is specifically described below.

As shown in FIG. 1, an optical pickup 400 has a laser light source 401, a collimating lens 402, a λ/2 waveplate 403, a polarization beam splitter (PBS) 404, λ/4 waveplates 405, 409, an objective lens 406, a reference light mirror 410, and an interference light detecting unit 500. The optical pickup 400 radiates a light beam to a reflective layer 408 of an optical disk 407, detects interference light obtained by interference between signal light reflected off of the reflective layer 408 and reference light, while scanning a track formed on the reflective layer 408, and outputs an electric signal.

The laser light source 401 emits a laser beam. The collimating lens 402 converts the laser beam output from the laser light source 401 into parallel light. The laser beam, converted into parallel light, then passes through the λ/2 waveplate 403 having its optical axis disposed at a random angle, and consequently the polarization direction of the laser beam is rotated a random angle. The polarization direction of the laser beam that has passed through the λ/2 waveplate 403 determines the split ratio between the intensities of the signal light and the reference light that are divided at the PBS 404. The PBS 404 transmits approximately 100% of horizontally-polarized light incident on a splitting surface of the PBS 404 and reflects approximately 100% of perpendicularly-polarized light incident on the splitting surface. The laser beam enters the PBS 404 and is divided into signal light corresponding substantially to the perpendicularly-polarized light reflected off of the splitting surface of the PBS 404 and reference light corresponding substantially to the horizontally-polarized light transmitted through the splitting surface of the PBS 404. The signal light and reference light are described as "substantially the perpendicularly-polarized light" and "substantially the horizontally-polarized light," for the purpose of taking into consideration variations in the precision of the optical elements and manufacturing of the optical elements.

First, the signal light passes through the λ/4 waveplate 405 and is focused on the objective lens 406. The focused signal light is reflected off of the reflective layer 408 of the optical disk 407. The signal light that is reflected at the optical disk 407 then travels toward the PBS 404 through the optical axis same as that of signal light traveling from the PBS 404 toward the optical disk 407. The signal light that is reflected off of the reflective layer 408 of the optical disk 407 passes through the objective lens 406 again and is then converted into parallel light by the objective lens 406. After passing through the objective lens 406 again and being converted into parallel light, the signal light passes through the λ/4 waveplate 405 again and returns to the PBS 404. At this point, the 714 waveplate 405 rotates the polarization direction of the signal light traveling from the optical disk 407 to the PBS 404 by approximately 90 degrees with respect to the polarization direction of the signal light traveling from the PBS 404 to the optical disk 407. Such an angle of rotation is described as "approximately 90 degrees," for the purpose of taking into consideration errors in manufacturing of the optical elements, errors in placement of the optical elements, and errors in the polarization directions due to the effect of the birefringence in the optical disk or optical elements.

Because the polarization direction of the signal light that has returned to the PBS 404 is rotated by approximately 90 degrees, most of the signal light that has returned to the PBS 404 is transmitted through the PBS 404 and received by the interference light detecting unit 500. However, due to possible errors in the polarization directions as described above, part of the signal light that has returned to the PBS 404 is reflected off of the PBS 404, passes through the optical axis same as that of the laser beam output from the laser light source 401, and returns to the laser light source 401 as return right.

Next, the reference light passes through the λ/4 waveplate 409 and is reflected off of the reference light mirror 410. The reference light reflected off of the reference light mirror 410 then travels to the PBS 404 through the optical axis same as that of reference light traveling from the PBS 404 toward the reference light mirror 410. The reference light reflected off of the reference light mirror 410 passes through the λ/4 waveplate 409 again and returns to the PBS 404. At this point, the λ/4 waveplate 409 rotates the polarization direction of the reference light traveling from the reference light mirror 410 to the PBS 404 by approximately 90 degrees with respect to the polarization direction of the reference light traveling from the PBS 404 to the reference light mirror 410.

Because the polarization direction of the reference light that has returned to the PBS 404 is rotated by approximately 90 degrees, most of the reference light that has returned to the PBS 404 is reflected off of the PBS 404 and received by the interference light detecting unit 500. However, due to possible errors in the polarization directions as described above, part of the reference light that has returned to the PBS 404 is transmitted through the PBS 404, passes through the optical axis same as that of the laser beam output from the laser light source 401, and returns to the laser light source 401 as return light.

First of all, a laser resonator length, an external resonator formed by a laser light source and an optical disk or a mirror, and return light are described below with reference to FIGS. 2, 3 and 4 to promote understanding of the embodiments of the present invention.

Figure 2:
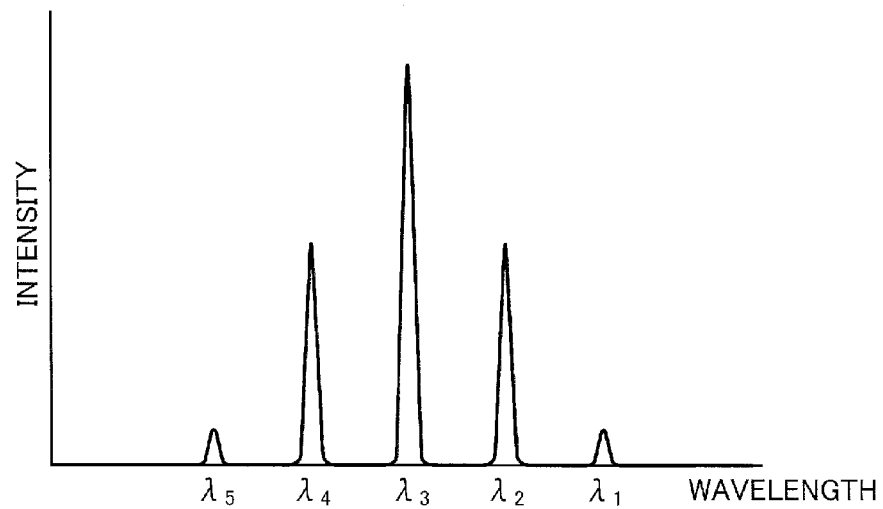
FIG. 2 is a diagram showing an example of a spectral intensity of a laser beam output from a laser light source mounted in the optical pickup.

FIG. 2 is a diagram showing an example of a spectral intensity of a laser beam that is output from a laser light source mounted in the optical pickup. FIG. 3 is a diagram schematically showing longitudinal multimode laser oscillation in a laser resonator as an example of laser oscillation. Examples of this laser light source 201 where such longitudinal multimode laser oscillation occurs include a Fabry-Perot laser light source. The following describes an example where, inside the laser light source 201, laser oscillation occurs at five wavelengths corresponding to standing waves that have wavelengths $\lambda_1$ to $\lambda_5$ shown in FIG. 2 and that might exist in the laser resonator. A wavelength at which the laser light source 201 can oscillate is a wavelength equivalent to a value that is obtained by the following expression (4) based on a refractive index $n_{ld}$ and an internal resonator length $l_{ld}$ of an internal resonator and is calculated by dividing an in-vacuum internal resonator length $L_{ld}$ as converted using a refractive index in vacuum set at 1 by an integer. This wavelength is limited to wavelengths at which a laser medium of the laser light source 201 can emit light.

$$L_{ld} = n_{ld} l_{ld} \qquad (4)$$

Figure 4:
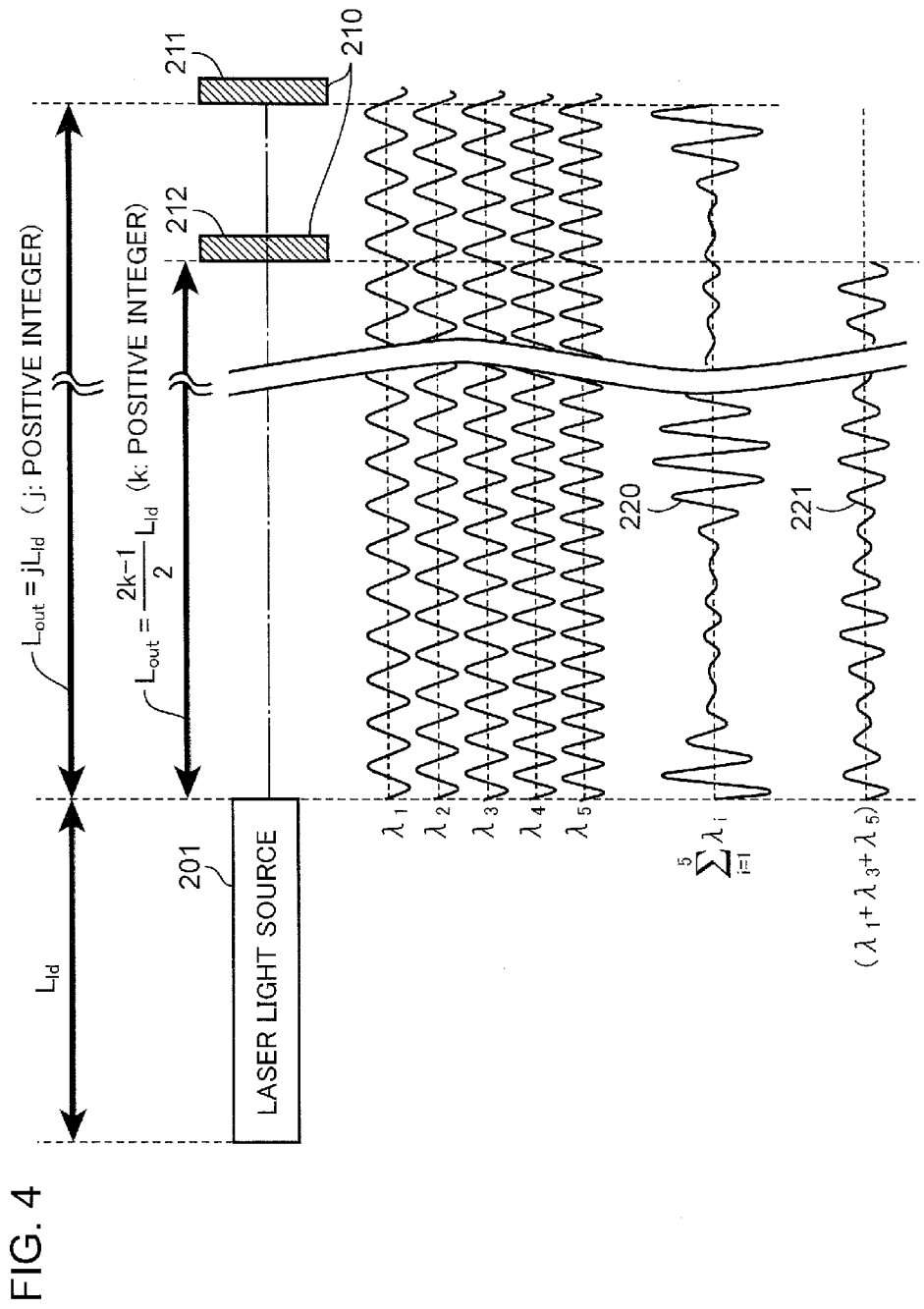
FIG. 4 is a diagram for illustrating an external resonator.

FIG. 4 is a diagram for illustrating an external resonator. FIG. 4 schematically shows a relationship between a front end surface or a rear end surface of the laser light source 201 and a reflecting unit 210 such as an optical disk or optical element (e.g., a mirror).

As shown in FIG. 4, the front end surface of the laser light source 201 is configured as an emission end surface from which a laser beam is emitted. An in-vacuum external resonator length $L_{out}$ is obtained by multiplying the distance between the emission end surface of the laser light source 201 and the reflecting unit 210 by a refractive index of the laser beam on an optical path. The in-vacuum external resonator length $L_{out}$ represents an optical path length of the external resonator as converted using a refractive index in vacuum set at 1, when the external resonator has a refractive index $n_{out}$. When the in-vacuum external resonator length $L_{out}$ satisfies specific conditions, it is possible that the laser beam from the laser light source 201 exists as a standing wave between the emission end surface of the laser light source 201 and the reflecting unit 210. When a standing wave exists in the external resonator, an unintended laser resonator ends up being formed by the internal resonator and the external resonator of the laser light source 201. As a result, laser oscillation in the unintended laser resonator becomes noise.

In particular, because the reflecting unit 210 (e.g., an information recording layer constituting a reflective surface of an optical disk) is not always located at in a certain position in an optical disk device, a large amplitude of a standing wave produced by overlapping a plurality of wavelengths by the unintended external resonator leads to a significant change in the amount of return light, increasing the laser oscillation noise.

Conditions for the in-vacuum external resonator length $L_{out}$ where return light noise increases are now described using specific examples. When the in-vacuum external resonator length $L_{out}$ satisfies the following expression (5) (when the reflecting unit 210 is present at a position 211 shown in FIG. 4), all of the wavelengths $\lambda_1$ to $\lambda_5$ shown in FIGS. 3 and 4 might exist as standing waves in the external resonator.

$$L_{out} = L_{ld} (j: \text{positive integer}) \qquad (5)$$

A standing wave 220 shown in FIG. 4 represents a standing wave obtained by adding up all of the wavelengths $\lambda_1$ to $\lambda_5$ when the expression (5) shown above is satisfied. In other words, the in-vacuum external resonator length $L_{out}$ is a positive integral multiple of the in-vacuum internal resonator length $L_{ld}$, all of the wavelengths contained in the laser beam from the laser light source 201 might exist as standing waves in the external resonator.

Figure 3:
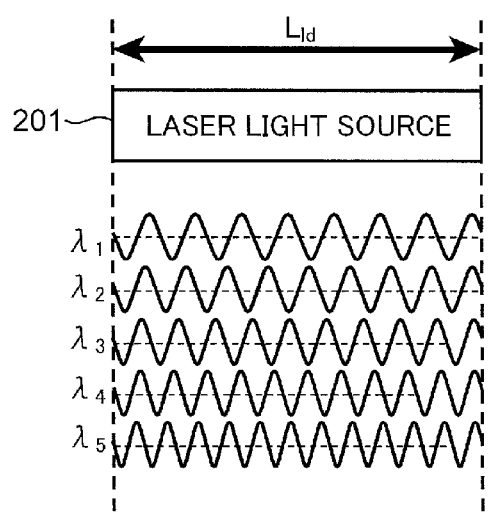
FIG. 3 is a diagram schematically showing longitudinal multimode laser oscillation in a laser resonator as an example of laser oscillation.

When the in-vacuum external resonator length $L_{out}$ and the in-vacuum internal resonator length $L_{ld}$ satisfy the following expression (6) (when the reflecting unit 210 is present at a position 212 shown in FIG. 4), the wavelengths $\lambda_1$, $\lambda_3$ and $\lambda_5$ shown in FIGS. 3 and 4 might also exist as standing waves in the external resonator.

[Math. 4]

$$L_{out} = \frac{2k-1}{2} L_{ld} \quad (6)$$

(k: positive integer)

A standing wave 221 shown in FIG. 4 represents a standing wave obtained by adding up the wavelength $\lambda_1$, the wavelength $\lambda_3$, and the wavelength $\lambda_5$ when the expression (6) shown above is satisfied. In other words, when the in-vacuum external resonator length $L_{out}$ is shorter than a distance that is a positive integral multiple of the in-vacuum internal resonator length $L_{ld}$ by a distance equivalent to half the in-vacuum internal resonator length $L_{ld}$, light having wavelengths with even numbers of waves among the wavelengths oscillated in the laser light source 201 might also exist as standing waves in the external resonator.

Specifically, in order to avoid the occurrences of standing waves satisfying the expressions (5) and (6), the in-vacuum external resonator length $L_{out}$ needs to be prevented from assuming a length that is an integral multiple of ½ of the in-vacuum internal resonator length $L_{ld}$. In addition, in some cases a standing wave exists where the number of waves is a multiple of three or four, and it is obvious that a similar phenomenon can occur.

In order to avoid all of the standing waves in which the number of waves is a multiple of a positive integer m, the in-vacuum external resonator length $L_{out}$ needs to be prevented from assuming a length that is an integral multiple of 1/m of the in-vacuum internal resonator length $L_{ld}$. However, as is clear from a comparison between the standing waves 220 and 221 shown in FIG. 4, the lower the number of wavelengths of a standing wave that might exist, the smaller the impact thereof.

Although the internal resonator length $l_{ld}$ can be measured relatively easily, it is extremely difficult to measure the refractive index $n_{ld}$ of the internal resonator. Therefore, the in-vacuum internal resonator length $L_{ld}$ may be obtained by measurement. For instance, a length equivalent to the in-vacuum internal resonator length $L_{ld}$ can be measured using the laser light source 201 and a reflecting mirror. First, the laser light source 201 and the reflecting mirror are arranged in such a manner that a laser beam oscillated by the laser light source 201 is reflected off of the reflecting mirror and returns to the laser light source 201. In this arrangement of the laser light source 201 and the reflecting mirror, the emission end surface of the laser light source 201 and the reflecting mirror constitute the external resonator.

Changing the external resonator length by changing the position of the reflecting mirror generates several parts where return light noise increases. When measuring return light noise, for example, an optical element for dividing a laser beam, such as a half mirror, may be disposed between the laser light source 201 and the reflecting mirror and intensity noise of the light divided by this optical element may be measured. External resonator lengths at which the return light noise increases match distances representing positive integral multiples of the in-vacuum internal resonator length $L_{ld}$, such as $L_{ld}$, $2L_{ld}$, and $3L_{ld}$. It is therefore obvious that measuring the shortest distance between two points where the return noise increases is the same as measuring the in-vacuum internal resonator length $L_{ld}$.

For the purpose of illustration, the above has described an example of a laser light source in which laser oscillation occurs at five wavelengths; however, the present invention is not limited to this example. The same effects can be obtained by an optical pickup and an optical disk device that use a laser light source in which longitudinal multimode laser oscillation occurs with less than five oscillation wavelengths or five or more oscillation wavelengths.

The in-vacuum internal resonator length $L_{ld}$ as converted using refractive index in vacuum set at 1 is obtained from the expression (4) shown above, wherein $l_{ld}$ and $n_{ld}$ represent the internal resonator length and refractive index of the laser light source 401, respectively. Further, $L_{BS}$ denotes an in-vacuum-converted optical path length from the emission end surface of the laser light source 401 to the splitting surface of the PBS 404 which takes the refractive index, length and in-vacuum distance of each optical element into consideration and which is an optical path length of a laser beam as converted using a refractive index in vacuum n (n=1). Similarly, $L_{sig}$ denotes an in-vacuum-converted optical path length of signal light from the splitting surface of the PBS 404 to the reflective layer 408 of the optical disk 407 as converted using a refractive index in vacuum. The term $L_{ref}$ denotes an in-vacuum-converted optical path length of reference light from the splitting surface of the PBS 404 to the reference light mirror 410 as converted using a refractive index in vacuum. However, when fluctuation caused by camming of the reflective layer 408 during rotation of the optical disk 407 produces a significant effect, the in-vacuum-converted optical path length $L_{sig}$ of the signal light becomes a value of the optical path length from the splitting surface of the PBS 404 to the center of the camming range of reflective layer 408 as converted using a refractive index in vacuum.

The in-vacuum-converted distances described above of the signal light and the reference light need to be set at distances where a large number of standing waves are generated, in order to reduce noise generated by the return light. In relation to return light of the signal light, the optical elements of the optical pickup 400 (the laser light source 401, the polarization beam splitter 404, and the reference light mirror 410) are arranged in such a manner as to satisfy the following expression (7) so that the emission end surface of the laser light source 401 and the reflective layer 408 of the optical disk 407 do not constitute an external resonator in which a large number of standing waves exist.

$$L_{sig} + L_{BS} \neq sL_{ld} \text{ (s: positive integer)} \quad (7)$$

In relation to return light of the reference light, the optical elements of the optical pickup 400 (the laser light source 401, the polarization beam splitter 404, and the reference light mirror 410) are arranged in such a manner as to satisfy the following expression (8) so that the emission end surface of the laser light source 401 and the reference light mirror 410 do not constitute an external resonator in which a large number of standing waves exist.

$$L_{ref} + L_{BS} \neq tL_{ld} \text{ (t: positive integer)} \quad (8)$$

Furthermore, in order to cause interference between the split signal light and reference light, the optical elements of the optical pickup 400 (the laser light source 401, the polarization beam splitter 404, and the reference light mirror 410) are arranged in such a manner that the difference between the in-vacuum-converted optical path length $L_{sig}$ of the signal light and the in-vacuum-converted optical path length $L_{ref}$ of the reference light satisfies the following expression (9).

[Math. 5]
$$uL_{ld} - \frac{L_{coh}}{2} \leq L_{sig} - L_{ref} \leq uL_{ld} + \frac{L_{coh}}{2} \quad (9)$$
($u$: integer)

In the expression (9) shown above, $L_{coh}$ represents a coherence length of a laser beam output from the laser light source 401. The coherence length $L_{coh}$ is expressed by the following expression (10) using a full width at half maximum $\Delta v$ of an oscillation wavelength spectrum of the laser beam and the speed of light c.

[Math. 6]
$$L_{coh} = \frac{c}{\Delta v} \quad (10)$$

By arranging the optical elements of the optical pickup 400 (the laser light source 401, the polarization beam splitter 404, and the reference light mirror 410) in such a manner as to satisfy the expressions (7), (8) and (9) shown above, noise caused by the return light of the signal and light and of the reference light can be reduced, and at the same time interference light obtained by interference between the signal light and reference light can be allowed to enter the interference light detecting unit 500.

Note that the expressions (7), (8) and (9) can further be generalized into the following expressions (11), (12) and (13).

[Math. 7]
$$L_{sig} + L_{BS} \neq s\frac{L_{ld}}{m} \quad (11)$$
($s$: positive integer, $m$: positive integer)

[Math. 8]
$$L_{ref} + L_{BS} \neq t\frac{L_{ld}}{m} \quad (12)$$
($t$: positive integer)

[Math. 9]
$$u\frac{L_{ld}}{m} - \frac{\Delta L}{2} \leq L_{sig} - L_{ref} \leq u\frac{L_{ld}}{m} + \frac{\Delta L}{2} \quad (13)$$
($u$: integer)

In the expressions (11), (12) and (13) shown above, $L_{ld}$ represents an in-vacuum internal resonator length of the laser light source 401 obtained as a product of an internal resonator length of the laser light source 401 and an internal resonator refractive index of the laser light source 401. The term $L_{BS}$ represents an in-vacuum-converted optical path length of a laser beam traveling from the emission end surface of the laser light source 401 to the polarization beam splitter (laser beam divider) 404. The term $L_{sig}$ represents an in-vacuum-converted optical path length of signal light traveling from the polarization beam splitter (laser beam divider) 404 to the reflective layer 408 of the optical disk 407. The term $L_{ref}$ represents an in-vacuum-converted optical path length of reference light traveling from the polarization beam splitter (laser beam divider) 404 and the reference light mirror 410. The term $\Delta L$ represents an interference permissible optical path length of a laser beam emitted from the laser light source 401. This $\Delta L$ indicates a distance range in which interference between the signal light and the reference light causes amplification and is proximal to, but not necessarily the same as, the distance expressed by the expression (9). The distance range is defined as the one causing optical amplification, which is an effect of the present invention obtained by the interference.

The laser light source 401, the polarization beam splitter (laser beam divider) 404, and the reference light mirror 410 are arranged in such a manner as to simultaneously satisfy the expressions (11) to (13).

Figure 5:
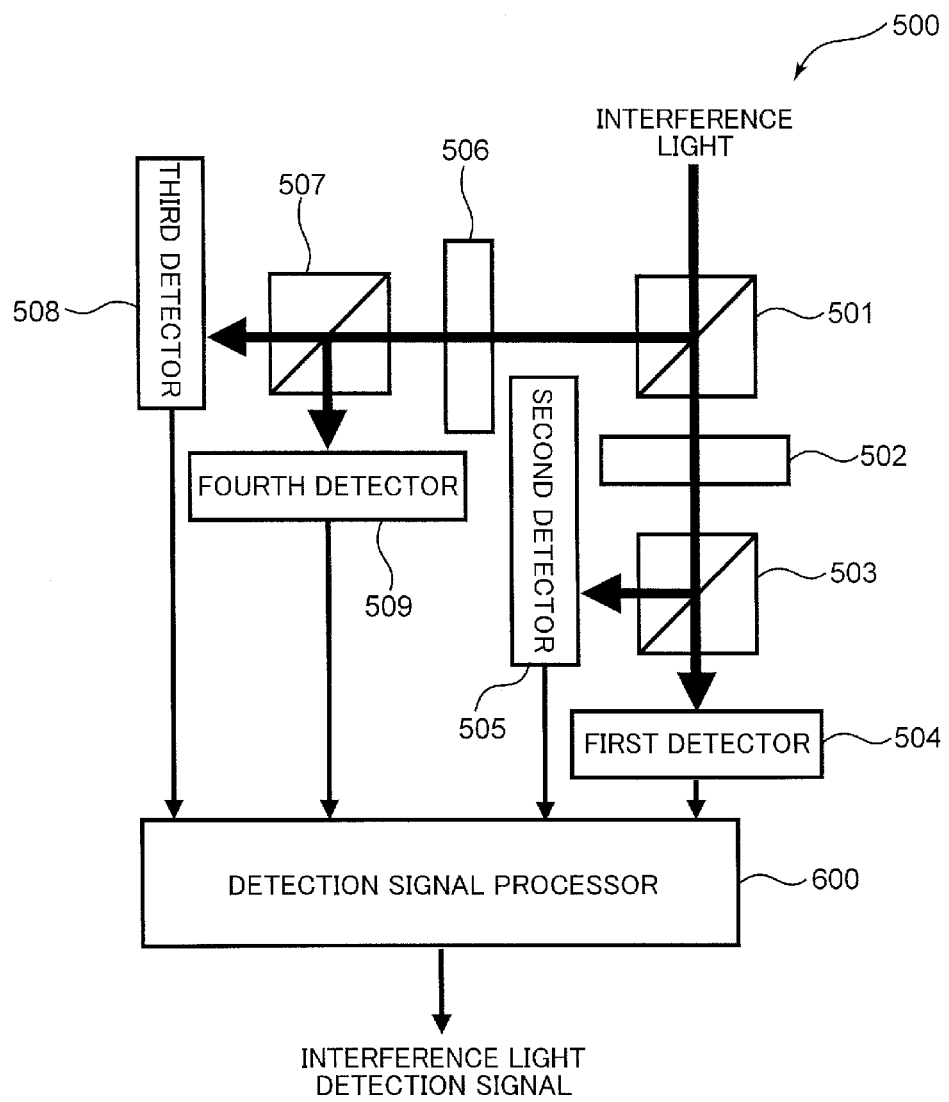
FIG. 5 is a diagram showing a configuration of an interference light detecting unit shown in FIG. 1.

Next, the interference light detecting unit 500 shown in FIG. 1 is described in detail with reference to FIG. 5. FIG. 5 is a diagram showing a configuration of the interference light detecting unit 500 shown in FIG. 1. The interference light detecting unit 500 shown in FIG. 5 has a half beam splitter (HBS) 501, a λ/2 waveplate 502, a λ/4 waveplate 506, a first PBS 503, a second PBS 507, a first detector 504, a second detector 505, a third detector 508, a fourth detector 509, and a detection signal processor 600.

The HBS 501 reflects and transmits interference light incident on the interference light detecting unit 500, in two directions at substantially the same intensity. The λ/2 waveplate 502 rotates the polarization direction of the interference light transmitted through the HBS 501 by 45 degrees. The first PBS 503 transmits approximately 100% of horizontally-polarized light of the interference light whose polarization direction has been rotated by 45 degrees, and then reflects approximately 100% of perpendicularly-polarized light of the same. The first detector 504 and the second detector 505 output electric signals corresponding to the amount of the incident interference light. The first detector 504 detects the horizontally-polarized light component of the interference light whose polarization direction has been rotated by 45 degrees, and outputs an electric signal corresponding to the amount of light. The second detector 505 detects the perpendicularly-polarized light component of the interference light whose polarization direction has been rotated by 45 degrees, and outputs an electric signal corresponding to the amount of light.

The λ/4 waveplate 506 rotates the polarization direction of the interference light reflected off of the HBS 501 by 45 degrees, and provides a position difference of π/2 (90 degrees) between the respective signal light components and reference light components of the perpendicularly-polarized light and the horizontally-polarized light. Among the interference light transmitted through the λ/4 waveplate 506, the second PBS 507 transmits approximately 100% of the horizontally-polarized light and reflects approximately 100% of the perpendicularly-polarized light. The third detector 508 and the fourth detector 509 output electric signals corresponding to the amount of incident interference light. The third detector 508 detects the horizontally-polarized light component of the interference light that has passed through the λ/4 waveplate 506, and then outputs an electric signal corresponding to the amount of light. The fourth detector 509 detects the perpendicularly-polarized light component of the interference light that has passed through the λ/4 waveplate 506, and outputs an electric signal corresponding to the amount of light. The electric signals output from the first detector 504, the second detector 505, the third detector 508, and the fourth detector 509 are input to the detection signal processor 600.

The detection signal processor 600 executes computation based on the electric signals output from the first detector 504, the second detector 505, the third detector 508, and the fourth detector 509, and then outputs an interference light detection signal.

A polarization state of the interference light incident on the interference light detecting unit 500 and obtained by interference between the signal light and the reference light is expressed by the form of a Jones vector by the following expression (14).

[Math. 10]

$$\begin{pmatrix} E_{sig} \\ E_{ref} \end{pmatrix} = \begin{pmatrix} A_{sig}\exp(i\theta + \phi_{sig}) \\ A_{ref}\exp(i\theta + \phi_{ref}) \end{pmatrix} \quad (14)$$

In the expression (14) shown above, the term $E_{sig}$ represents an electric field of the signal light reflected off of the optical disk 407. The term $A_{sig}$ represents an amplitude component of the electric field of the signal light. The term $E_{ref}$ represents an electric field of the reference light reflected off of the reference light mirror 410. The term $A_{ref}$ represents an amplitude component of the electric field of the reference light. The term $\theta$ represents a phase component associated with an oscillation wavelength, time and place of a laser beam. The term $\phi_{sig}$ represents a phase component of the electric field of the signal light that changes due to optical path fluctuation and the like. The term $\phi_{ref}$ represents a phase component of the electric field of the reference light that changes due to optical path fluctuation and the like.

A Jones vector of the interference light transmitted through the HBS 501 and then the λ/2 waveplate 502 is expressed by the following expression (15). Here, the λ/2 waveplate 502 is disposed in such a manner that the direction at an angle of 22.5 degrees becomes a fast axis as viewed from the horizontal polarization direction. Fast axis is an oscillation direction in which light travels fast on a waveplate. An oscillation direction in which light travels slowly is referred to as "slow axis."

[Math. 11]

$$\begin{pmatrix} \cos45° & \sin45° \\ \sin45° & -\cos45° \end{pmatrix} \begin{pmatrix} \dfrac{E_{sig}}{\sqrt{2}} \\ \dfrac{E_{ref}}{\sqrt{2}} \end{pmatrix} = \begin{pmatrix} \dfrac{(E_{sig}+E_{ref})}{2} \\ \dfrac{(E_{sig}-E_{ref})}{2} \end{pmatrix} \quad (15)$$

Next, the electric field of the interference light transmitted through the first PBS 503 and the electric field of the interference light reflected off of the first PBS 503 are expressed by the following expressions (16) and (17), respectively.

Transmitted interference light(horizontally-polarized light):$(E_{sig}+E_{ref})/2$ (16)

Reflected interference light(perpendicularly-polarized light):$(E_{sig}-E_{ref})/2$ (17)

Consequently, the detection signals obtained by the first detector 504 and the second detector 505 are expressed by the following expressions (18) and (19), respectively.

[Math. 12]

First detector 504: $\eta\left|\dfrac{(E_{sig}+E_{ref})}{2}\right|^2 =$ (18)

$$\eta\left(\dfrac{1}{4}A_{sig}^2 + \dfrac{1}{4}A_{ref}^2 + \dfrac{1}{2}A_{sig}A_{ref}\cos\Delta\phi\right)$$

Second detector 505: $\eta\left|\dfrac{(E_{sig}-E_{ref})}{2}\right|^2 =$ (19)

$$\eta\left(\dfrac{1}{4}A_{sig}^2 + \dfrac{1}{4}A_{ref}^2 - \dfrac{1}{2}A_{sig}A_{ref}\cos\Delta\phi\right)$$

※ $\Delta\phi = \phi_{sig} - \phi_{ref}$

In the expressions (18) and (19) shown above, the term $\eta$ represents a conversion efficiency of each detector. The term $\Delta\phi$ represents a phase difference based on the difference in optical path length between the signal light and the reference light.

On the other hand, a Jones vector of the interference light reflected off of the HBS 501 and transmitted through the λ/4 waveplate 506 is expressed by the following expression (20). At this point, the λ/4 waveplate 506 is disposed in such a manner that the direction at an angle of 45 degrees becomes the fast axis as viewed from the horizontal polarization direction.

[Math. 13]

$$\dfrac{1-i}{2}\begin{pmatrix} i+\cos90° & \sin90° \\ \sin90° & i-\cos90° \end{pmatrix}\begin{pmatrix} \dfrac{E_{sig}}{\sqrt{2}} \\ -\dfrac{E_{ref}}{\sqrt{2}} \end{pmatrix} = \dfrac{1-i}{\sqrt{2}}\begin{pmatrix} \dfrac{i(E_{sig}-iE_{ref})}{2} \\ \dfrac{(E_{sig}+iE_{ref})}{2} \end{pmatrix} \quad (20)$$

Next, the electric field of the interference light transmitted through the second PBS 507 and the electric field of the interference light reflected off of the second PBS 507 are expressed by the following expressions (21) and (22).

[Math. 14]

Transmitted interference light (21)

(horizontally-polarized light): $\dfrac{1-i}{\sqrt{2}}\left\{\dfrac{i(E_{sig}-iE_{ref})}{2}\right\}$ Reflected interference light (22)

(perpendicularly-polarized light): $\dfrac{1-i}{\sqrt{2}}\left\{\dfrac{(E_{sig}+iE_{ref})}{2}\right\}$ Consequently, the detection signals obtained by the third detector 508 and the fourth detector 509 are expressed by the following expressions (23) and (24), respectively.

[Math. 15]

Third detector 508: $\eta\left|\dfrac{i(E_{sig}-iE_{ref})}{2}\right|^2 =$ (23)

$$\eta\left(\dfrac{1}{4}A_{sig}^2 + \dfrac{1}{4}A_{ref}^2 - \dfrac{1}{2}A_{sig}A_{ref}\sin\Delta\phi\right)$$

-continued $$\text{Fourth detector 509: } \eta \left| \frac{(E_{sig} + iE_{ref})}{2} \right|^2 = \quad (24)$$

$$\eta \left( \frac{1}{4} A_{sig}^2 + \frac{1}{4} A_{ref}^2 + \frac{1}{2} A_{sig} A_{ref} \sin \Delta \phi \right)$$

Figure 6:
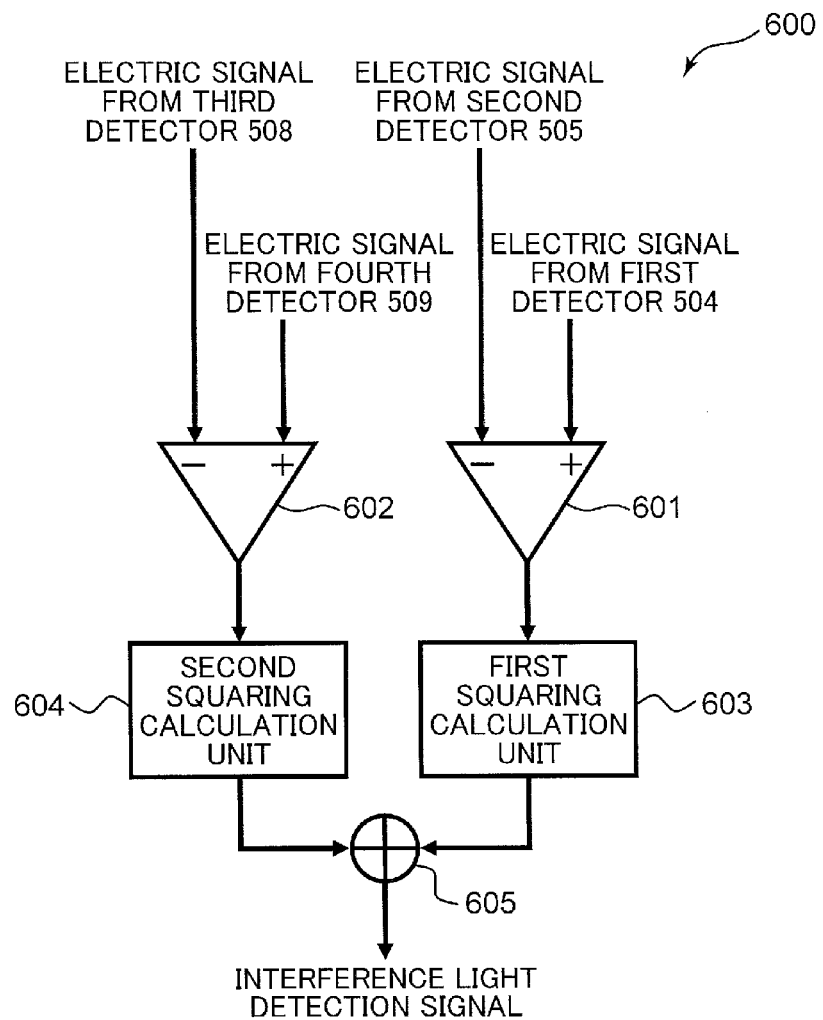
FIG. 6 is a diagram showing a configuration of a detection signal processor shown in FIG. 5.

Next, the detection signal processor 600 shown in FIG. 5 is described in detail with reference to FIG. 6. FIG. 6 is a diagram showing a configuration of the detection signal processor shown in FIG. 5. The detection signal processor 600 has a first differential calculation unit 601, a second differential calculation unit 602, a first squaring calculation unit 603, a second squaring calculation unit 604, and an addition operation unit 605.

The first differential calculation unit 601 obtains a cos differential signal, expressed by the following expression (25), by performing differential calculation on an electric signal output from the first detector 504 and an electric signal output from the second detector 505. The second differential calculation unit 602 obtains a sin differential signal, expressed by the following expression (26), by performing differential calculation on an electric signal output from the fourth detector 509 and an electric signal output from the third detector 508.

$$\text{cos differential signal: } \eta A_{sig} A_{ref} \cos \Delta \phi = A \cos \Delta \phi \quad (25)$$

$$\text{sin differential signal: } \eta A_{sig} A_{ref} \sin \Delta \phi = A \sin \Delta \phi \quad (26)$$

The first squaring calculation unit 603 obtains a cos squared signal, expressed by the following expression (27), by performing squaring calculation on the cos differential signal. The second squaring calculation unit 604 obtains a sin squared signal, expressed by the following expression (28), by performing squaring calculation on the sin differential signal.

$$\text{cos squared signal: } A^2 \cos^2 \Delta \phi \quad (27)$$

$$\text{sin squared signal: } A^2 \sin^2 \Delta \phi \quad (28)$$

The addition operation unit 605 obtains an interference light detection signal, expressed by the following expression (29), by adding up the cos squared signal and the sin squared signal.

$$\text{Interference light detection signal: } A^2 = (\eta A_{sig} A_{ref})^2 \quad (29)$$

As a result, a detection signal amplified with the reference light can be obtained with respect to the detection signal $\eta A_{sig}$ obtained by a conventional optical pickup.

Such a configuration can accomplish both inhibition of return light noise by reducing external resonance caused by the return light of the signal light and of the reference light, and amplification of weak signal light by means of the reference light by causing interference between the signal light and the reference light. Therefore, unlike the conventional optical pickup, an optical pickup with an increased S/N of a reproduction signal can be realized even on a large-volume optical disk that is denser and has more layers.

Although Embodiment 1 illustrates the optical pickup with reference to FIG. 1, the optical pickup 400 may further have an optical element such as a prism or a beam splitter and a photoelectric conversion element to facilitate servo control of the objective lens 406, such as focus control and tracking control.

Furthermore, according to Embodiment 1, the optical elements are arranged in such a manner as to have the in-vacuum-converted optical path lengths that satisfy the expressions (7), (8) and (9) shown above, but the same effects can be achieved even when the positions of the optical elements are controlled to have the in-vacuum-converted optical path lengths satisfying the expressions (7), (8) and (9).

Figure 7:
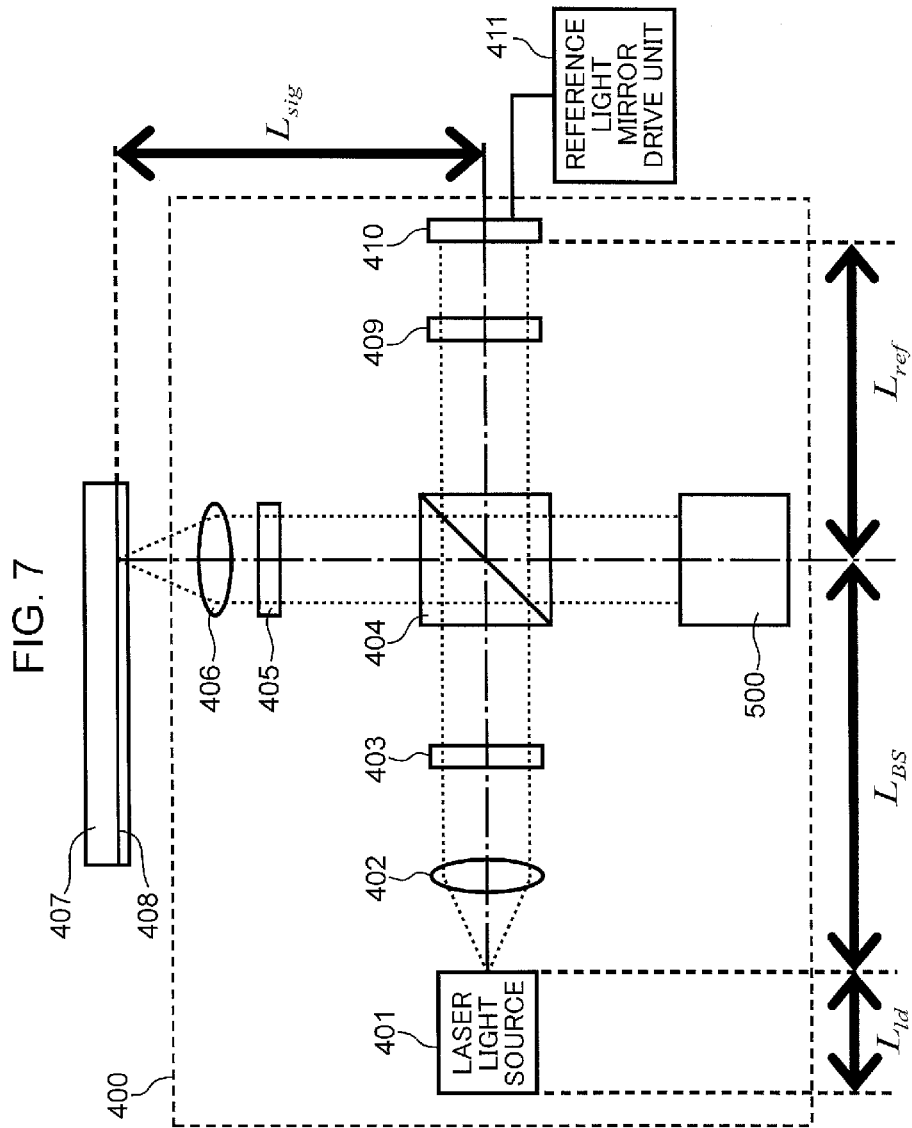
FIG. 7 is a diagram showing a configuration of an optical pickup according to a first modification of Embodiment 1 of the present invention.

FIG. 7 is a diagram showing a first modification of the optical pickup according to Embodiment 1 of the present invention. The optical pickup 400 shown in FIG. 7 further has a reference light mirror drive unit 411 for driving the reference light mirror 410. The reference light mirror drive unit 411 changes the position of the reference light mirror 410 by moving the reference light mirror 410 in the direction of the optical axis of the reference light. The reference light mirror drive unit 411 moves the reference light mirror 410 to a position where the expressions (7) to (9) are satisfied simultaneously. Note that the position of the reference light mirror 410 may be controlled by detecting a change in oscillation wavelength of the laser light source 401 or camming of the optical disk 407. In addition, a drive mechanism of the reference light mirror drive unit 411 may change the position of the reference light mirror by using the same drive mechanism as the one driving the objective lens 406.

In Embodiment 1, while the coherence length $L_{coh}$ defines the range of an optical path length difference between the optical path length of the signal light and the optical path length of the reference light in the expression (9), when an S/N is beyond an allowable range of the system the optical elements may be arranged or controlled in such a manner that the difference in optical path length falls within a range defined by a narrower value than the coherence length $L_{coh}$.

As shown in FIG. 1, the optical axis of the λ/2 waveplate 403 is set at a random angle; however, the optical pickup 400 may be further provided with a drive mechanism for rotating the optical axis, and the split ratio between the signal light and the reference light may be changed.

Moreover, as shown in FIG. 1, the polarization direction of the laser beam output from the laser light source 401 is controlled by the λ/2 waveplate 403; however, the present invention is not limited to this configuration. For example, the polarization direction of the laser beam may be changed by rotating the laser light source 401 itself.

Figure 8:
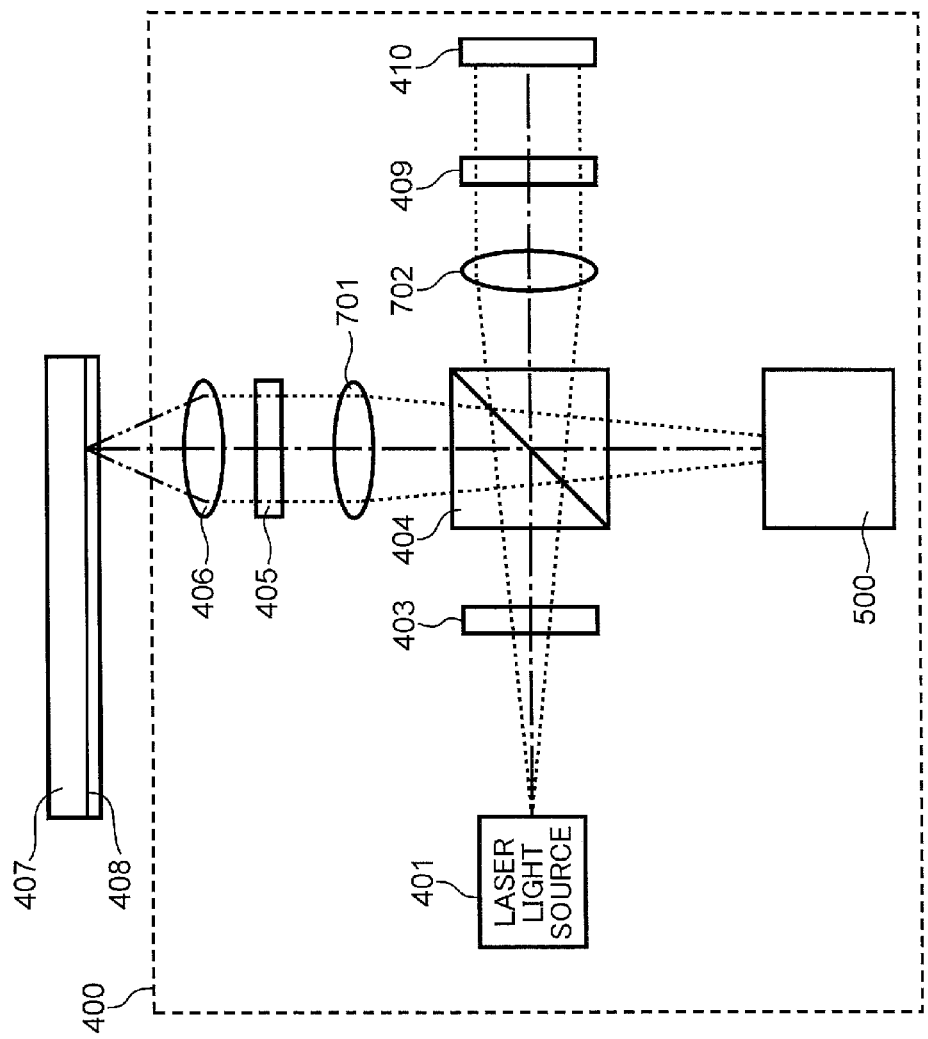
FIG. 8 is a diagram showing a configuration of an optical pickup according to a second modification of Embodiment 1 of the present invention.

In addition, as shown in FIG. 1, the collimating lens 402 for forming the laser beam output from the laser light source 401 into parallel light is disposed between the laser light source 401 and the λ/2 waveplate 403; however, the present invention is not limited to this configuration. FIG. 8 is a diagram showing a second embodiment of the optical pickup according to Embodiment 1 of the present invention. For example, a collimating lens 701 may be disposed between the PBS 404 and the λ/4 waveplate 405, and a collimating lens 702 may be disposed between the PBS 404 and the λ/4 waveplate 409, as shown in FIG. 8.

The optical disk 407 has one reflective layer 408, as shown in FIG. 1; however, the present invention is not limited to this configuration. For example, the optical disk 407 may have two, three, or more reflective layers.

The reflecting unit of the optical disk 407 is not necessarily a continuous layer, as shown in FIG. 1. For instance, the reflecting unit of the optical disk 407 may be divided into small areas such as pits.

Figure 9:
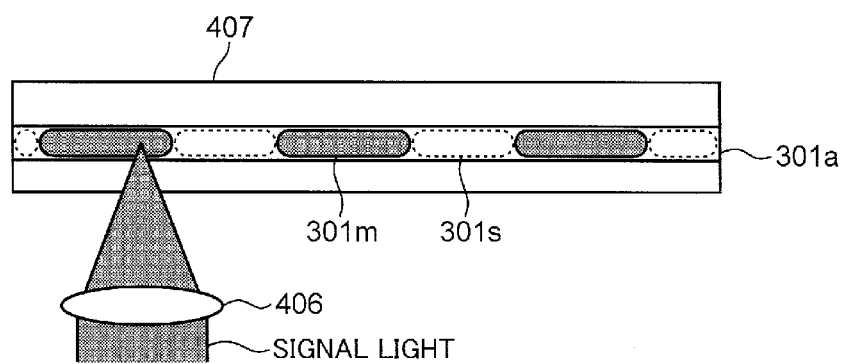
FIG. 9 is a diagram for illustrating an example of modulating an intensity of signal light in an optical disk.
Figure 10:
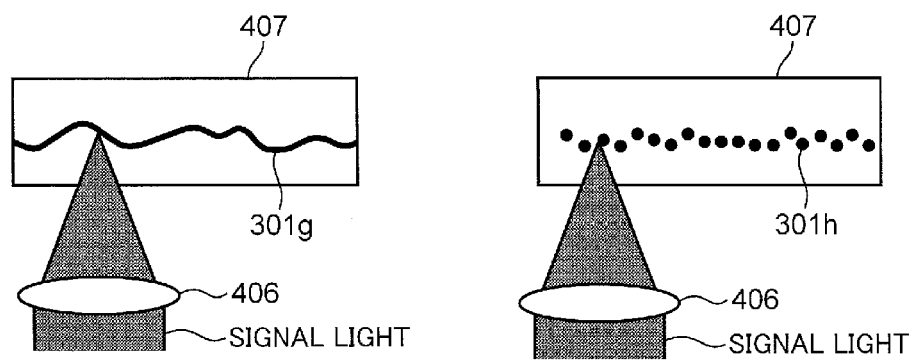
FIG. 10 is a diagram for illustrating an example of modulating a phase of the signal light in the optical disk.

FIGS. 9 and 10 are diagrams for illustrating modulation of signal light in the optical disk. FIG. 9 is a diagram for illustrating an example of modulating the intensity of signal light in the optical disk. FIG. 10 is a diagram for illustrating an example of modulating the phase of the signal light in the optical disk.

In the optical disk 407, mainly, the reflectance of a reflective layer 301a shown in FIG. 9 is changed by radiation of a laser beam, and consequently the intensity of the resultant reflected light is modulated. As a result, information is recorded on the optical disk 407. In other words, a mark 301*m* and a space 301*s* with mutually different reflectances are formed on a track on the reflective layer 301*a*, and as a result information is recorded on the optical disk 407. The optical disk 407 is, for example, a rewritable or write-once CD, DVD or Blu-ray Disc™.

Generally in the optical disk 407, the reflectance of the reflective layer 301*a* is changed by radiation of a laser beam as shown in FIG. 9, and consequently the intensity of the resultant reflected light is modulated, thereby recording information; however, the present invention is not limited to this configuration. In the optical disk according to Embodiment 1, optical interference can be used to detect the intensity and phase of the light. The information may be recorded by the formation of a continuous reflective groove 301*g* or discrete reflective hole 301*h* in the optical disk 407, as shown in FIG. 10. Even such an optical disk in which information is recorded by modulation of the phase of the reflected light can achieve the same effects as those of the optical disk in which information is recorded by modulation of the intensity of the reflected light. The detection signal processor 600 detects the phase of the reflected light by, for example, computing an arctan of a value by dividing the sin differential signal of the expression (26) by the cos differential signal of the expression (25).

Figure 11:
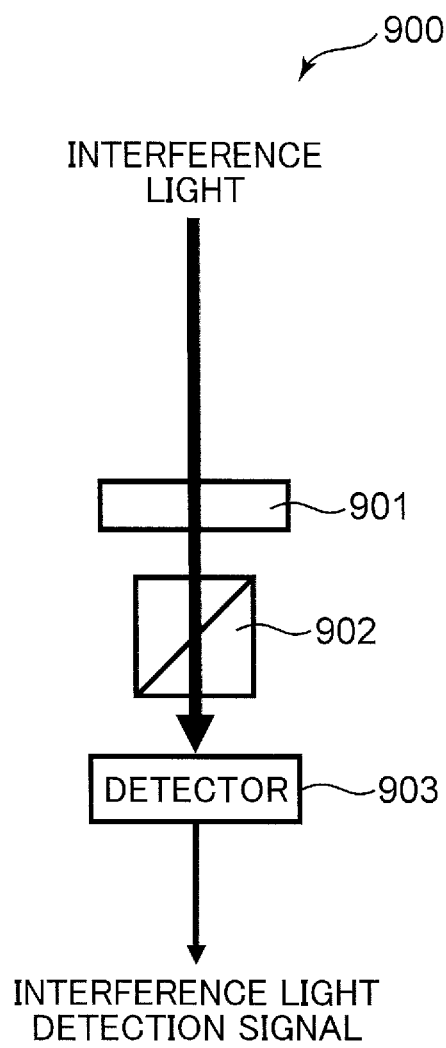
FIG. 11 is a diagram showing a first modification of the interference light detecting unit according to Embodiment 1 of the present invention.

FIGS. 5 and 6 illustrate the configuration in which the interference light detection signal is detected by the four detectors; however, the present invention is not limited to this configuration. FIG. 11 is a diagram showing a first modification of the interference light detecting unit according to Embodiment 1 of the present invention. For instance, the configuration shown in FIG. 11 can detect interference light with a single detector. The interference light detecting unit shown in FIG. 11 is now described hereinafter in detail.

An interference light detecting unit 900 shown in FIG. 11 has a λ/2 waveplate 901, a PBS 902, and a detector 903. The λ/2 waveplate 901 is disposed in such a manner that the polarization direction of interference light incident on the interference light detecting unit 900 is rotated by 45 degrees. The PBS 902 transmits approximately 100% of horizontally-polarized light of the interference light whose polarization direction has been rotated by 45 degrees, and reflects approximately 100% of perpendicularly-polarized light of the same. The detector 903 outputs an electric signal corresponding to the amount of the incident interference light. The detector 903 detects the horizontally-polarized light component of the interference light whose polarization direction has been rotated by 45 degrees, and outputs an electric signal corresponding to the amount of the detected horizontally-polarized light component. A Jones vector of the light transmitted through the λ/2 waveplate 901 is expressed by the following expression (30). At this point, the λ/2 waveplate 901 is disposed in such a manner that the direction at an angle of 22.5 becomes a fast axis as viewed from the horizontal polarization direction.

[Math. 16]

$$\begin{pmatrix} \cos 45° & \sin 45° \\ \sin 45° & -\cos 45° \end{pmatrix} \begin{pmatrix} E_{sig} \\ E_{ref} \end{pmatrix} = \begin{pmatrix} \dfrac{(E_{sig} + E_{ref})}{\sqrt{2}} \\ \dfrac{(E_{sig} - E_{ref})}{\sqrt{2}} \end{pmatrix} \quad (30)$$

Subsequently, an electric field of the light transmitted through the PBS 902 is expressed by the following expression (31).

[Math. 17]

Transmitted light(horizontally-polarized light):$(E_{sig} + E_{ref})/\sqrt{2}$ (31)

Consequently, the detection signal obtained by the detector 903 is expressed by the following expression (32).

[Math. 18]

$$\text{Detector 903: } \eta \left| \dfrac{(E_{sig} + E_{ref})}{\sqrt{2}} \right|^2 = \eta \left( \dfrac{1}{2} A_{sig}^2 + \dfrac{1}{2} A_{ref}^2 + A_{sig} A_{ref} \cos \Delta \phi \right) \quad (32)$$

In order to keep the difference in optical path length between signal light and reference light constant, the cos term in the expression (32) shown above can be set at a constant by, for example, controlling the position of the reference light mirror 410. As a result, an interference light detection signal in which the signal light is amplified with the reference light can be obtained.

Figure 12:
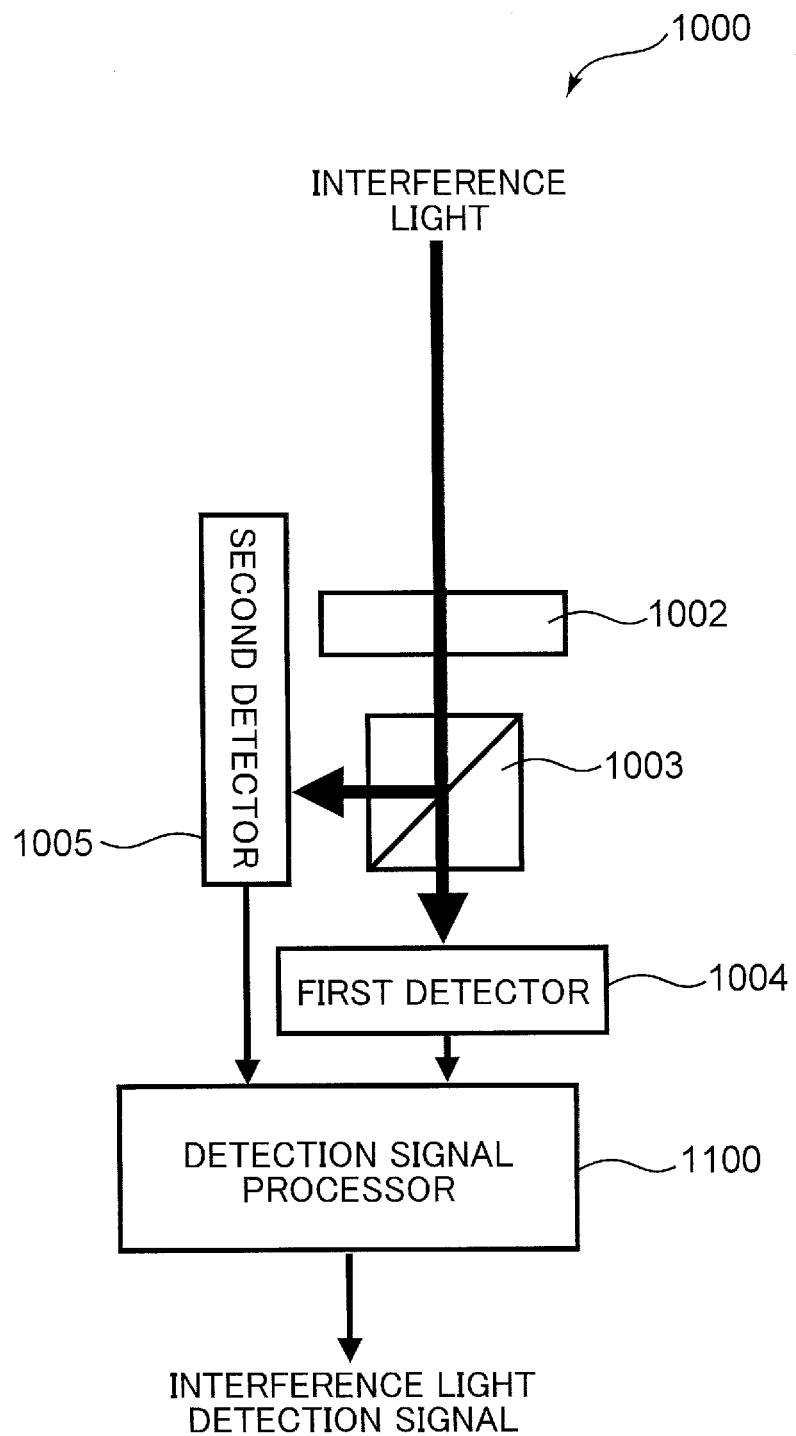
FIG. 12 is a diagram showing a second modification of the interference light detecting unit according to Embodiment 1 of the present invention.
Figure 13:
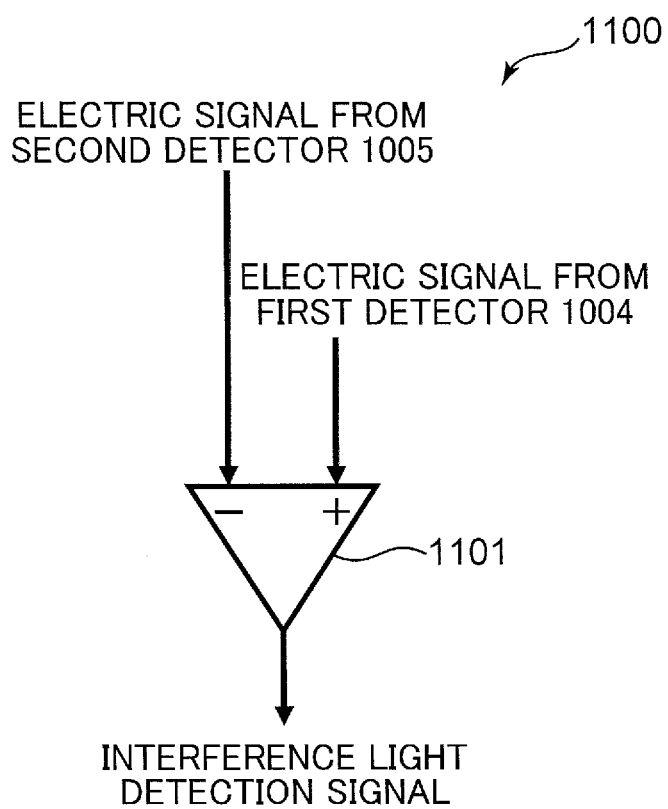
FIG. 13 is a diagram showing a configuration of a detection signal processor shown in FIG. 12.

Furthermore, the configuration shown in FIGS. 12 and 13 in which the interference light detecting unit only detects a cos component of the interference light can obtain the interference light detection signal using only two detectors. FIG. 12 is a diagram showing a second modification of the interference light detecting unit according to Embodiment 1 of the present invention. FIG. 13 is a diagram showing a configuration of a detection signal processor shown in FIG. 12.

An interference light detecting unit 1000 shown in FIG. 12 has a λ/2 waveplate 1002, a PBS 1003, a first detector 1004, a second detector 1005, and a detection signal processor 1100. The detection signal processor 1100 has a differential calculation unit 1101.

The λ/2 waveplate 1002 rotates the polarization direction of incident interference light by 45 degrees. The PBS 1003 transmits approximately 100% of horizontally-polarized light of the interference light whose polarization direction has been rotated by 45 degrees, and reflects approximately 100% of perpendicularly-polarized light of the same. The first detector 1004 and the second detector 1005 output electric signals corresponding to the amount of incident interference light. The first detector 1004 detects the horizontally-polarized light of the interference light whose polarization direction has been rotated by 45 degrees, and then outputs an electric signal corresponding to the amount of the detected horizontally-polarized light. The second detector 1005 detects the perpendicularly-polarized light of the interference light whose polarization direction has been rotated by 45 degrees, and then outputs an electric signal corresponding to the amount of the detected perpendicularly-polarized light. The differential calculation unit 1101 outputs a differential signal between the electric signal output from the first detector 1004 and the electric signal output from the second detector 1005, as an interference light detection signal.

Unlike the interference light detecting unit 500 shown in FIG. 5, the interference light detecting unit 1000 does not have the interference light divided by the HBS 501. The interference light detecting unit 1000, therefore, can obtain an interference light detection signal by multiplying the cos differential signal of the expression (25) by two. In addition, controlling the position of the reference light mirror 410, for example, can also obtain the interference light detection signal having the cos term of the expression (25) set at a constant.

Figure 14:
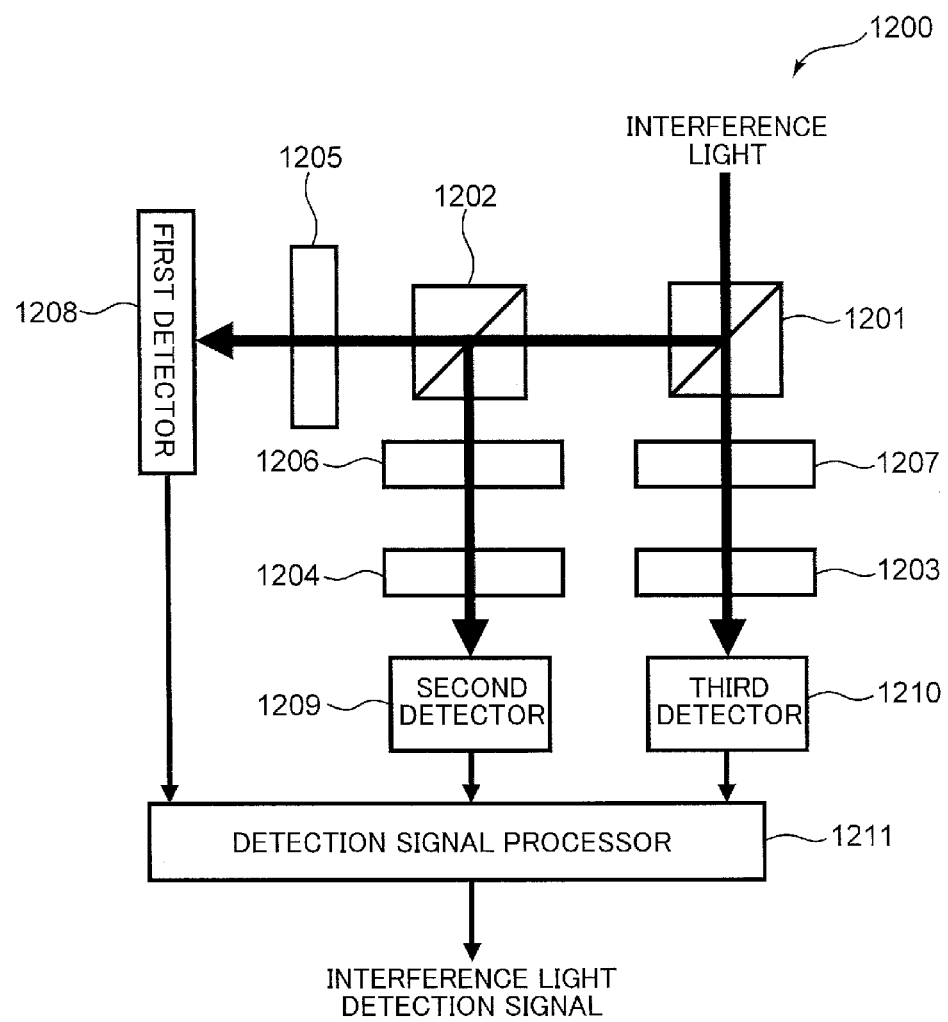
FIG. 14 is a diagram showing a third modification of the interference light detecting unit according to Embodiment 1 of the present invention.

The interference light can also be detected using three detectors, as shown in FIG. 14. FIG. 14 is a diagram showing a third modification of the interference light detecting unit according to Embodiment 1 of the present invention. The interference light detecting unit shown in FIG. 14 is now described hereinafter in detail. In the following description, the differences in phase between the signal light and the reference light in the respective detectors are 0, 2π/3, and 4π/3.

An interference light detecting unit 1200 shown in FIG. 14 has unpolarization beam splitters (BS) 1201, 1202, polarizers 1203, 1204, 1205, phase plates 1206, 1207, a first detector 1208, a second detector 1209, a third detector 1210, and a detection signal processor 1211. The polarizers 1203, 1204, 1205 transmit 45-degree polarized light. The phase plate 1206 generates a phase difference of 5π/3 between signal light and reference light. The phase plate 1207 generates a phase difference of π/3 between the signal light and the reference light.

The BS 1201 divides interference light incident on the interference light detecting unit 1200 at an intensity ratio of 2:1. The ratio between the reflected light and the transmitted light is 2:1 in the BS 1201. The ratio between the reflected light and the transmitted light is an intensity division ratio. The BS 1201 generates a phase difference of π between the signal light and the reference light with respect to the reflected light.

First, the light reflected off of the BS 1201 enters the BS 1202. The BS 1202 divides the incident light at an intensity ratio of 1:1. Here, the ratio between reflected light and the transmitted light is 1:1 in the BS 1202. This ratio between the reflected light and the transmitted light is an intensity division ratio. The BS 1202 generates a phase difference of π between the signal light and the reference light with respect to the reflected light.

The light transmitted through the BS 1202 enters the polarizer 1205. The polarizer 1205 only transmits 45-degree polarized light of the incident light. The first detector 1208 detects the light transmitted through the polarizer 1205. In so doing, the because the light detected by the first detector 1208 is reflected off of the BS 1201, a phase difference of π is generated between the signal light and the reference light.

Subsequently, the light reflected off of the BS 1202 enters the phase plate 1206. The phase plate 1206 generates a phase difference of 5π/3 between the signal light and the reference light with respect to the incident light. In so doing, light that has a phase difference of 11π/3(=5π/3) between signal light and reference light enters the polarizer 1204, the phase difference being obtained by adding up the phase difference generated by the reflection at the BS 1201 and the phase difference generated by the reflection at the BS 1202. The polarizer 1204 only transmits 45-degree polarized light of the incident light. The light transmitted through the polarizer 1204 is detected by the second detector 1209.

Next, the light transmitted through the BS 1201 enters the phase plate 1207. The phase plate 1207 generates a phase difference of π/3 between signal light and reference light with respect to the incident light. The light that has a phase difference of π/3 between the signal light and the reference light enters the polarizer 1203. The polarizer 1203 only transmits 45-degree polarized light of the incident light. The light transmitted through the polarizer 1203 is detected by the third detector 1210. In this case, signals (intensities of the light) $I_A$, $I_B$, $I_C$ detected by the first detector 1208, the second detector 1209, and the third detector 1210 are expressed by the following expressions (33) to (35).

[Math. 19]

First detector 1208:
$$I_A = \eta\left|\frac{1}{\sqrt{3}}E_{sig} - \frac{1}{\sqrt{3}}E_{ref}\right|^2 = \eta\left(\frac{1}{3}A_{sig}^2 + \frac{1}{3}A_{ref}^2 - \frac{2}{3}A_{sig}A_{ref}\cos\Delta\phi\right) \quad (33)$$

Second detector 1209:
$$I_B = \eta\left|\frac{1}{\sqrt{3}}E_{sig} + \frac{1}{\sqrt{3}}e^{-\frac{\pi}{3}i}E_{ref}\right|^2 = \eta\left(\frac{1}{3}A_{sig}^2 + \frac{1}{3}A_{ref}^2 + \frac{2}{3}A_{sig}A_{ref}\cos\left(\Delta\phi + \frac{\pi}{3}\right)\right) \quad (34)$$

Third detector 1210:
$$I_C = \eta\left|\frac{1}{\sqrt{3}}E_{sig} + \frac{1}{\sqrt{3}}e^{\frac{\pi}{3}i}E_{ref}\right|^2 = \eta\left(\frac{1}{3}A_{sig}^2 + \frac{1}{3}A_{ref}^2 + \frac{2}{3}A_{sig}A_{ref}\cos\left(\Delta\phi - \frac{\pi}{3}\right)\right) \quad (35)$$

Based on these expressions (36) and (37) shown above, the detection signal processor 1211 calculates a cos component ($A \cos \Delta\phi$) and a sin component ($A \sin \Delta\phi$) from each of the signals $I_A$, $I_B$, $I_C$ detected by the first detector 1208, the second detector 1209, and the third detector 1210.

[Math. 20]

$$A\cos\Delta\phi = I_A - \frac{I_B + I_C}{2} \quad (36)$$

$$A\sin\Delta\phi = \frac{\sqrt{3}}{2}(I_C - I_B) \quad (37)$$

The detection signal processor 1211 can obtain the same interference light detection signal as the one shown in the expression (29), by squaring the calculated cos components and sin components and adding up the squared cos components and the squared sin components.

In Embodiment 1, the detection signal processors 600, 1100, and 1211 each output a single interference light detection signal, but each of these detection signal processors 600, 1100, and 1211 may output a signal obtained in the course of processing it. For example, the detection signal processor 600 may output two signals, i.e., the output from the differential calculation unit 601 (cos differential signal) and the output from the differential calculation unit 602 (sin differential signal).

Furthermore, although the optical path of a laser beam prior to splitting, the optical path of the signal light, and the optical path of the reference light are all constituted by the respective optical elements and air in Embodiment 1, the present invention is not limited to such a configuration. For example, some or all of the optical path of a laser beam prior to splitting, the optical path of the signal light, and the optical path of the reference light may be constituted using composite optical function elements such as nanophotonic material, an optical waveguide, or an optical fiber.

In addition, in Embodiment 1, some or all of the optical path of a laser beam prior to splitting, the optical path of the signal light, the optical path of the reference light, and the interference light detecting unit 500 may be integrated on a single LSI (Large Scale Integration) in which an optical waveguide, an electric circuit, and an electronic circuit are integrated.

The positional relationship among the optical elements in the optical pickup 400 has been described in Embodiment 1 wherein the in-vacuum-converted optical path lengths may satisfy the expressions (7), (8) and (9) shown above. However, all wavelengths having even numbers of waves among the standing waves oscillated in the laser light source 401 may be prevented from simultaneously becoming standing waves in an external resonator. More specifically, the optical elements of the optical pickup 400 (the laser light source 401, the polarization beam splitter 404, and the reference light mirror 410) may be arranged or controlled in such a manner that the in-vacuum-converted optical path lengths satisfy the following expressions (38), (39) and (40).

[Math. 21]

$$L_{sig} + L_{BS} \neq s' \frac{L_{ld}}{2} \quad (38)$$

($s'$: positive integers)

[Math. 22]

$$L_{ref} + L_{BS} \neq t' \frac{L_{ld}}{2} \quad (39)$$

($t'$: positive integers)

[Math. 23]

$$u' \frac{L_{ld}}{2} - \frac{L_{coh}}{2} \leq L_{sig} - L_{ref} \leq u' \frac{L_{ld}}{2} + \frac{L_{coh}}{2} \quad (40)$$

($u'$: positive integers)

Moreover, the positional relationship among the optical elements in the optical pickup 400 has been described in Embodiment 1 wherein the in-vacuum-converted optical path lengths may satisfy the expressions (7), (8) and (9) shown above. However, the arrangement or positional control of the optical elements in the optical pickup 400 is not necessarily limited. The same effects can be achieved by inserting one or more optical elements having a refractive index of 1 or higher into the optical path of a laser beam prior to splitting, the optical path of the signal light, and the optical path of the reference light so that the in-vacuum-converted optical path lengths satisfy the expressions (7), (8) and (9).

The in-vacuum internal resonator length $L_{ld}$ is dependent on an input current value of the laser light source 401 or on ambient temperature. Therefore, a single appropriate in-vacuum internal resonator length such as an average value ($L_{ld(ave)}$) of all possible in-vacuum internal resonator lengths $L_{ld}$, or a reference value ($L_{ld0}$) obtained when a frequently-used input current value is set under a temperature environment with a high frequency of use, may be obtained and assigned to the in-vacuum internal resonator lengths $L_{ld}$ of the expressions (7), (8) and (9).

Furthermore, when the optical disk 407 has a plurality of reflective layers, the in-vacuum-converted optical path length $L_{sig}$ of the signal light may be an optical path length from the splitting surface of the PBS 404 to one specific reflective layer (e.g., a reflective layer with the lowest S/N) or may be an average value of optical lengths from the splitting surface of the PBS 404 to the reflective layers.

Embodiment 2

Figure 15:
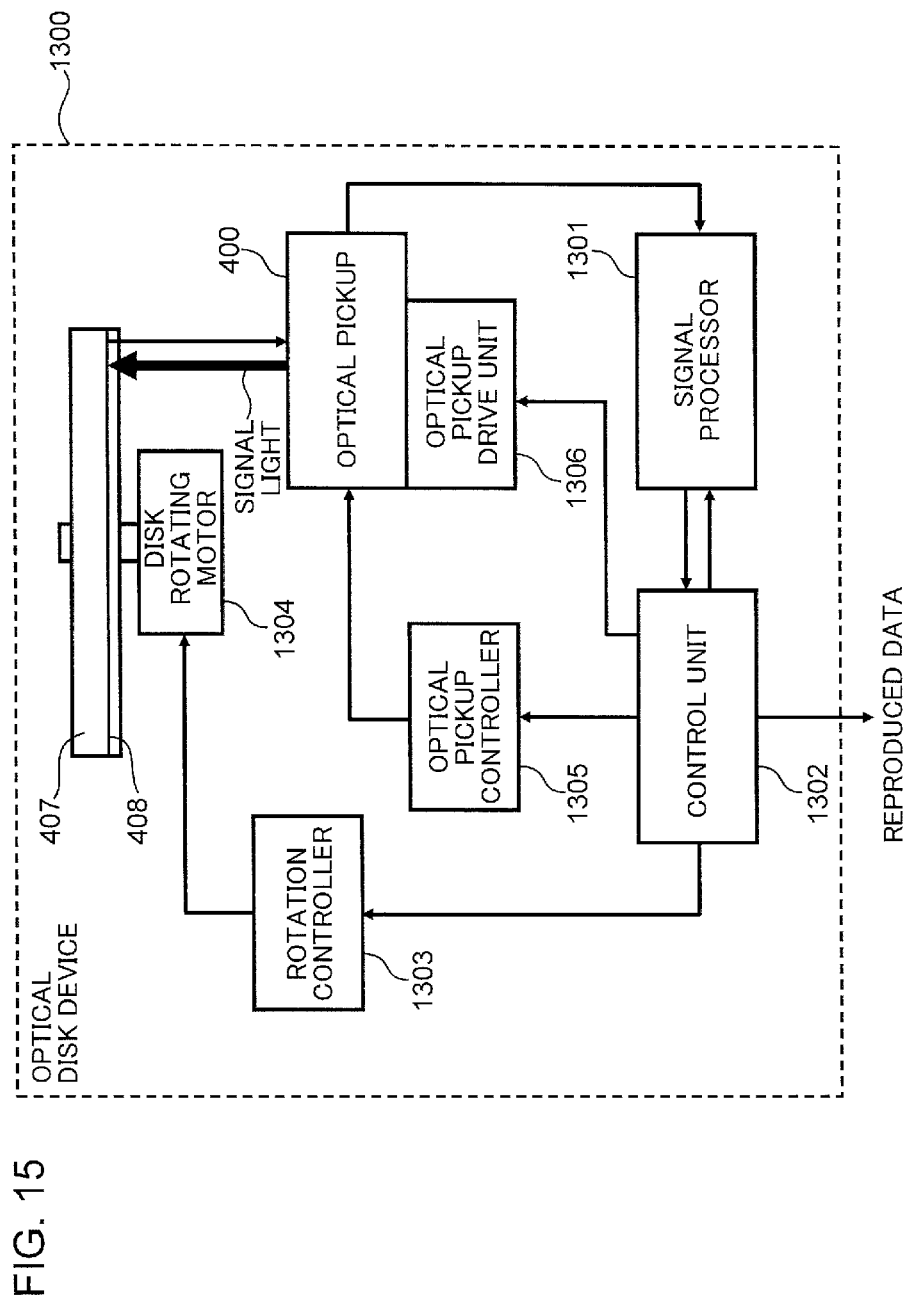
FIG. 15 is a diagram showing a schematic configuration of an optical disk device according to Embodiment 2 of the present invention.
Figure 16:
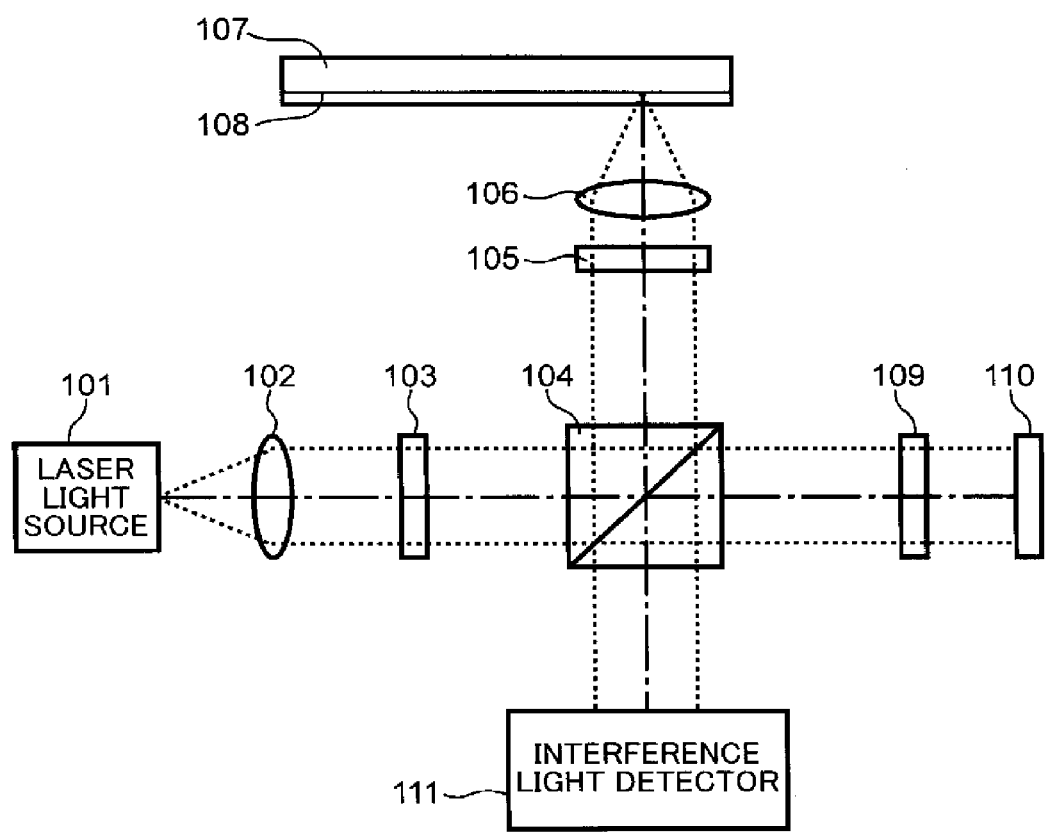
FIG. 16 is a diagram showing a configuration of the conventional optical disk device using optical interference.

FIG. 15 is a diagram showing a schematic configuration of an optical disk device according to Embodiment 2 of the present invention. In FIG. 15, the same components as those shown in FIGS. 1, 5 and 6 are denoted by the same reference numerals, and the descriptions thereof will be omitted accordingly.

The optical disk 407 on which information is recorded is inserted into an optical disk device 1300, and, using a clock signal generated from the optical disk 407, the optical disk device 1300 reproduces the information recorded on the reflective layer 408 of the optical disk 407.

As shown in FIG. 15, the optical disk device 1300 has the optical pickup 400, a signal processor 1301, a control unit 1302, a rotation controller 1303, a disk rotating motor 1304, an optical pickup controller 1305, and an optical pickup drive unit 1306. The configuration of the optical pickup 400 is the same as that described in Embodiment 1.

The signal processor 1301 obtains reproduced data, address data, and various signals such as a clock signal by executing filter processing, waveform equalization processing, demodulation, error correction and the like on an interference light detection signal output from the optical pickup 400. From the signal output from the optical pickup 400, the signal processor 1301 then generates servo error signals such as a focus error signal and a tracking error signal, and outputs such generated signals to the control unit 1302.

Based on the various signals received from the signal processor 1301 and a command from a user, the control unit 1302 outputs various control signals to the rotation controller 1303, the optical pickup controller 1305, and the optical pickup drive unit 1306. The control unit 1302 also outputs the reproduced data received from the signal processor 1301, as user data, to a host device of the optical disk device 1300.

Based on the control signals received from the control unit 1302, the rotation controller 1303 outputs a control signal for controlling the rotating speed of the disk rotating motor 1304. The disk rotating motor 1304 rotates the optical disk 407 at the rotating speed in accordance with the control signal received from the rotation controller 1303.

Based on a focus control signal, a tracking control signal, and a laser control signal that are received from the control unit 1302, the optical pickup controller 1305 outputs a control signal for controlling each component of the optical pickup 400. With the focus control signal, a focus position of the objective lens 406 in the optical pickup 400 is controlled to be positioned in the vicinity of the reflective layer 408. Furthermore, with the tracking control signal, a focal point of the objective lens 406 in the optical pickup 400 is controlled to trace the track formed on the reflective layer 408. Moreover, with the laser control signal, a laser power or oscillation wavelength of the laser light source 401 of the optical pickup 400 can be controlled. Based on the control signals received from the control unit 1302, the optical pickup drive unit 1306 controls the position of the optical pickup 400 so that the optical pickup 400 moves to a designated radius position of the optical disk 407.

Such a configuration can accomplish both inhibition of return light noise by reducing external resonance caused by the return light of the signal light and of the reference light, and amplification of weak signal light by means of the reference light by causing interference between the signal light and the reference light. Therefore, unlike the conventional optical pickup, an optical disk device that is equipped with an optical pickup with an increased S/N of a reproduction signal can be realized even on a large-volume optical disk that is denser and has more layers.

In Embodiment 1, the optical pickup has the detection signal processors shown in FIGS. 5, 6, 12, 13 and 14; however, the signal processor 1301 may be provided with a part of any of the detection signal processors. For example, the signal processor 1301 may have the squaring calculation unit 603, the squaring calculation unit 604, and the addition operation unit 605 of the detection signal processor 600.

In addition, Embodiment 2 has used FIG. 15 to describe the optical disk device that only reproduces information; however, the present invention is not limited to such a configuration. The optical disk device may record and reproduce information.

According to Embodiment 2, FIG. 15 shows a schematic configuration of the optical disk device, but some or all of the signal processor 1301, the control unit 1302, the rotation controller 1303, and the optical pickup controller 1305 may be integrated on the same LSI.

According to Embodiment 1, FIG. 1 shows an optical pickup equipped with one laser light source: however, the optical pickup may be equipped with two or more laser light sources having mutually different oscillation wavelengths, and record and reproduce information onto a plurality of types of optical disks corresponding to these oscillation wavelengths.

The specific embodiments described above primarily include an invention configured as described below.

An optical pickup according to one aspect of the present invention has: a laser light source for emitting a laser beam; a laser beam divider that divides the laser beam emitted from the laser light source into signal light that is focused on a reflecting unit of an optical disk and reference light that is not focused on the optical disk; a reference light mirror that reflects the reference light; and an interference light detecting unit that detects interference light in which the signal light modulated by the reflecting unit of the optical disk and the reference light reflected off of the reference light mirror interfere with each other, wherein the laser light source, the laser beam divider, and the reference light mirror are arranged in such a manner as to satisfy the following expressions (41) to (43) simultaneously, where $L_{ld}$ represents an in-vacuum internal resonator length of the laser light source that is obtained as a product of an internal resonator length of the laser light source and an internal resonator refractive index of the laser light source, $L_{BS}$ represents an in-vacuum-converted optical path length of the laser beam between an emission end surface of the laser light source and the laser beam divider, $L_{sig}$ represents an in-vacuum-converted optical path length of the signal light between the laser beam divider and the reflecting unit of the optical disk, $L_{ref}$ represents an in-vacuum-converted optical path length of the reference light between the laser beam divider and the reference light mirror, and $\Delta L$ represents an interference permissible optical path length of the laser beam.

[Math. 24]

$$L_{sig} + L_{BS} \neq s\frac{L_{ld}}{m} \quad (41)$$

(s: positive integers, m: positive integers)

[Math. 25]

$$L_{ref} + L_{BS} \neq t\frac{L_{ld}}{m} \quad (42)$$

(t: positive integers)

[Math. 26]

$$u\frac{L_{ld}}{m} - \frac{\Delta L}{2} \leq L_{sig} - L_{ref} \leq u\frac{L_{ld}}{m} + \frac{\Delta L}{2} \quad (43)$$

(u: integer)

According to this configuration, the laser light source emits a laser beam. The laser beam divider divides the laser beam emitted from the laser light source into signal light that is focused on a reflecting unit of an optical disk and reference light that is not focused on the optical disk. The reference light mirror reflects the reference light. The interference light detecting unit detects interference light in which the signal light modulated by the reflecting unit of the optical disk and the reference light reflected off of the reference light mirror interfere with each other. The laser light source, the laser beam divider, and the reference light mirror are arranged in such a manner as to satisfy the expressions (41) to (43) simultaneously, where $L_{ld}$ represents an in-vacuum internal resonator length of the laser light source that is obtained as a product of an internal resonator length of the laser light source and an internal resonator refractive index of the laser light source, $L_{BS}$ represents an in-vacuum-converted optical path length of the laser beam between an emission end surface of the laser light source and the laser beam divider, $L_{sig}$ represents an in-vacuum-converted optical path length of the signal light between the laser beam divider and the reflecting unit of the optical disk, $L_{ref}$ represents an in-vacuum-converted optical path length of the reference light between the laser beam divider and the reference light mirror, and $\Delta L$ represents an interference permissible optical path length of the laser beam.

Thus, arranging the laser light source, the laser beam divider, and the reference light mirror in such a manner as to satisfy the expressions (41) to (43) can reduce noise that is generated as a result of external resonance caused by return light of the signal light and the reference light and obtain a reproduction signal having a high S/N ratio.

Furthermore, in the optical pickup, it is preferred that the interference permissible optical path length $\Delta L$ be a coherence length of the laser beam.

According to this configuration, the interference permissible optical path length $\Delta L$ is a coherence length of the laser beam. The coherence length can easily be calculated using a full width at half maximum of an oscillation wavelength spectrum of the laser beam and the speed of light. The interference permissible optical path length $\Delta L$ can easily be obtained in this manner.

In the optical pickup, it is preferred that the positive integer m in the expressions (41) to (43) be 1.

According to this configuration, standing waves in which the number of waves is a multiple of a positive integer can be avoided, and noise that is generated by external resonance caused due to return light of the signal light and the reference light can be reduced.

It is preferred that the optical pickup further have a reference light mirror drive unit that moves the reference light mirror to a position that satisfies the expressions (41) to (43) simultaneously.

According to this configuration, the reference light mirror drive unit moves the reference light mirror to a position that satisfies the expressions (41) to (43) simultaneously. Therefore, since changing the position of the reference light mirror can change the initial optical path length of the reference light, the reference light mirror can be disposed in such a manner as to simultaneously satisfy the expressions (41) to (43) in response to a change in the initial optical path length of the signal light or a change in the central oscillation wavelength.

An optical disk device according to another aspect of the present invention has: any of the optical pickups described above; a motor for rotating an optical disk; and a controller for controlling the motor and the optical pickup based on a signal obtained from the optical pickup. According to this configuration, the optical pickup can be applied to the optical disk device.

It is to be understood that the specific embodiments or examples described in Description of Embodiments are merely illustrative of the technical contents of the present invention, and that the present invention should not be construed as being limited to such specific examples. Various modifications of the present invention can be made without departing from the spirit of the present invention and the scope of the claims.

INDUSTRIAL APPLICABILITY

The optical pickup and the optical disk device according to the present invention can reduce noise that is generated due to external resonance caused by return noise of signal light and reference light, and obtain a reproduction signal having a high S/N ratio. The optical pickup and the optical disk device according to the present invention are useful as an optical pickup and an optical disk device that detect a modulated signal by detecting interference light in which the intensity/phase-modulated signal light and the reference light interfere with each other.

The invention claimed is:

1. An optical pickup, comprising:
a laser light source for emitting a laser beam;
a laser beam divider that divides the laser beam emitted from the laser light source into signal light that is focused on a reflecting unit of an optical disk and reference light that is not focused on the optical disk;
a reference light mirror that reflects the reference light; and
an interference light detecting unit that detects interference light in which the signal light modulated by the reflecting unit of the optical disk and the reference light reflected off of the reference light mirror interfere with each other,
wherein the laser light source, the laser beam divider, and the reference light mirror are arranged in such a manner as to satisfy the following expressions (1) to (3) simultaneously,

[Math. 1]

$$L_{sig} + L_{BS} \neq s\frac{L_{ld}}{m} \quad (1)$$

(s: positive integer, m: positive integer)

[Math. 2]

$$L_{ref} + L_{BS} \neq t\frac{L_{ld}}{m} \quad (2)$$

(t: positive integer)

[Math. 3]

$$u\frac{L_{ld}}{m} - \frac{\Delta L}{2} \leq L_{sig} - L_{ref} \leq u\frac{L_{ld}}{m} + \frac{\Delta L}{2} \quad (3)$$

(u: integer)

where $L_{ld}$ represents an in-vacuum internal resonator length of the laser light source that is obtained as a product of an internal resonator length of the laser light source and an internal resonator refractive index of the laser light source, $L_{BS}$ represents an in-vacuum-converted optical path length of the laser beam between an emission end surface of the laser light source and the laser beam divider, $L_{sig}$ represents an in-vacuum-converted optical path length of the signal light between the laser beam divider and the reflecting unit of the optical disk, $L_{ref}$ represents an in-vacuum-converted optical path length of the reference light between the laser beam divider and the reference light mirror, and $\Delta L$ represents an interference permissible optical path length of the laser beam.

2. The optical pickup according to claim 1, wherein the interference permissible optical path length $\Delta L$ is a coherence length of the laser beam.

3. The optical pickup according to claim 1, wherein the positive integer m in the expressions (1) to (3) is 1.

4. The optical pickup according to claim 1, further comprising a reference light mirror drive unit that moves the reference light mirror to a position that satisfies the expressions (1) to (3) simultaneously.

5. An optical disk device, comprising:
the optical pickup described in claim 1;
a motor for rotating an optical disk; and
a controller for controlling the motor and the optical pickup based on a signal obtained from the optical pickup.

* * * * *